United States Patent
Burbidge et al.

(10) Patent No.: US 10,602,550 B2
(45) Date of Patent: Mar. 24, 2020

(54) LAYER 2 RELAY PROTOCOLS AND MOBILITY RELAY METHOD

(71) Applicant: INTEL IP CORPORATION, Santa Clara, CA (US)

(72) Inventors: Richard Burbidge, Shrivenham (GB); Sangeetha Bangolae, Houston, TX (US); Youn Hyoung Heo, Seoul (KR); Kyeongin Jeong, Portland, OR (US); Jaemin Han, Hillsboro, OR (US); Mo-Han Fong, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/745,868

(22) PCT Filed: Dec. 23, 2015

(86) PCT No.: PCT/US2015/000296
§ 371 (c)(1),
(2) Date: Jan. 18, 2018

(87) PCT Pub. No.: WO2017/014716
PCT Pub. Date: Jan. 26, 2017

(65) Prior Publication Data
US 2018/0213577 A1   Jul. 26, 2018

Related U.S. Application Data

(60) Provisional application No. 62/196,138, filed on Jul. 23, 2015.

(51) Int. Cl.
*H04W 76/10* (2018.01)
*H04W 88/04* (2009.01)

(52) U.S. Cl.
CPC .......... *H04W 76/10* (2018.02); *H04W 88/04* (2013.01)

(58) Field of Classification Search
CPC ............................ H04W 76/10; H04W 88/04
(Continued)

(56) References Cited

U.S. PATENT DOCUMENTS

2014/0177539 A1   6/2014   Novak et al.
2014/0198708 A1   7/2014   Lee
(Continued)

FOREIGN PATENT DOCUMENTS

WO   20120102546 A2   8/2012
WO   20140180517 A1   11/2014

OTHER PUBLICATIONS

International Search Report and Written Opinion for International Patent Application No. PCT/US2015/000296 dated Apr. 25, 2016; 13 pages.
(Continued)

*Primary Examiner* — Obaidul Huq
(74) *Attorney, Agent, or Firm* — Fish & Richardson P.C.

(57) ABSTRACT

There is are provided methods and apparatus relating to layer 2 relaying and mobility using a sidelink interface, including a remote user equipment (UE) for use in a wireless communication network, the UE comprising: a device to network (D2N) entity, a device to device (D2D) entity, and control logic to: receive a service data unit derived from an IP packet direct the service data unit to the D2N entity for communication with an eNB using a Uu interface in a first mode of operation, and direct the service data unit to the D2D entity for communication with the eNB via a first relay UE using a sidelink interface in a second, relay, mode of operation.

19 Claims, 12 Drawing Sheets

(58) Field of Classification Search
USPC .................................................. 370/310, 315
See application file for complete search history.

(56) References Cited

U.S. PATENT DOCUMENTS

| | | | |
|---|---|---|---|
| 2016/0135203 A1* | 5/2016 | Kim ...................... | H04W 48/20 370/315 |
| 2016/0204847 A1* | 7/2016 | Ryu ................... | H04B 7/15507 455/7 |
| 2016/0277922 A1* | 9/2016 | Gunnarsson ............ | H04W 8/26 |
| 2018/0054755 A1* | 2/2018 | Lee ................... | H04W 72/1284 |
| 2018/0077618 A1* | 3/2018 | Lee ....................... | H04W 36/06 |

OTHER PUBLICATIONS

3GPP TS 23.303 V13.0.0 (Jun. 2015); "Technical Specification Group Services and System Aspects; Proximity-based services (ProSe); Stage 2 (Release 13)," 97 pages.

\* cited by examiner

LAYER 2 RELAY PROTOCOLS AND MOBILITY RELAY METHOD

CROSS REFERENCE TO RELATED APPLICATIONS

The present application is a national phase entry under 35 U.S.C. § 371 of International Application No. PCT/US2015/000296, filed Dec. 23, 2015, entitled "LAYER 2 RELAY PROTOCOLS AND MOBILITY RELAY METHOD", which claims priority to U.S. Provisional Patent Application No. 62/196,138, filed Jul. 23, 2015, entitled "LAYER 2 RELAY PROTOCOLS AND MOBILITY", the entire disclosures of which are hereby incorporated by reference in their entireties.

TECHNICAL FIELD

Embodiments described herein generally relate to the field of wireless communications and, more particularly, to methods and apparatus for facilitating relaying in a wireless communication system.

BACKGROUND

It is becoming more important to be able to provide telecommunication services to fixed and mobile subscribers as efficient and inexpensively as possible. Further, the increased use of mobile applications has resulted in much focus on developing wireless systems capable of delivering large amounts of data at high speed.

Currently, as part of the Proximity Services (ProSe) capability introduced in Release 13 of the LTE Standards, a basic level of functionality has been described to allow network-to-user equipment (UE) relaying, specifically targeting Public Safety use cases. This functionality relies on the reuse of a sidelink radio communication channel between devices to route traffic at the Internet Protocol (IP) layer. The following functions are supported using this relaying approach:

- Unicast relaying: Based on one-to-one direct communication between a Remote UE, that is not served by the Evolved Universal Terrestrial Access Network (E-UTRAN), including support for the relaying of unicast traffic (uplink and downlink) between Remote UEs and the E-UTRAN. The ProSe UE-to-Network Relay provides a generic layer 3 (L3) forwarding function that may relay any type of IP traffic that is relevant for public safety communication.
- Evolved Multimedia Broadcast Multicast Service (eMBMS) relay support: One to many communication, including support for the relaying of eMBMS to Remote UEs served by the UE-to-NW Relay.
- E-UTRAN Cell Global Identifier (ECGI) announcement: The announcement of the ECGI by a ProSe UE-to-NW Relay allowing remote UEs served by a ProSe UE-to-NW Relay to receive the value of the ECGI of the cell serving the ProSe UE-to-NW Relay.

The application of relaying using the sidelink channel to more general use cases, beyond the requirements of Public Security, may require modifications to be made to the currently provided relaying functionality.

BRIEF DESCRIPTION OF THE DRAWING

Aspects, features and advantages of embodiments of the present invention will become apparent from the following description of the invention in reference to the appended drawings in which like numerals denote like elements and in which.

DETAILED DESCRIPTION OF EMBODIMENTS

Figure 1:
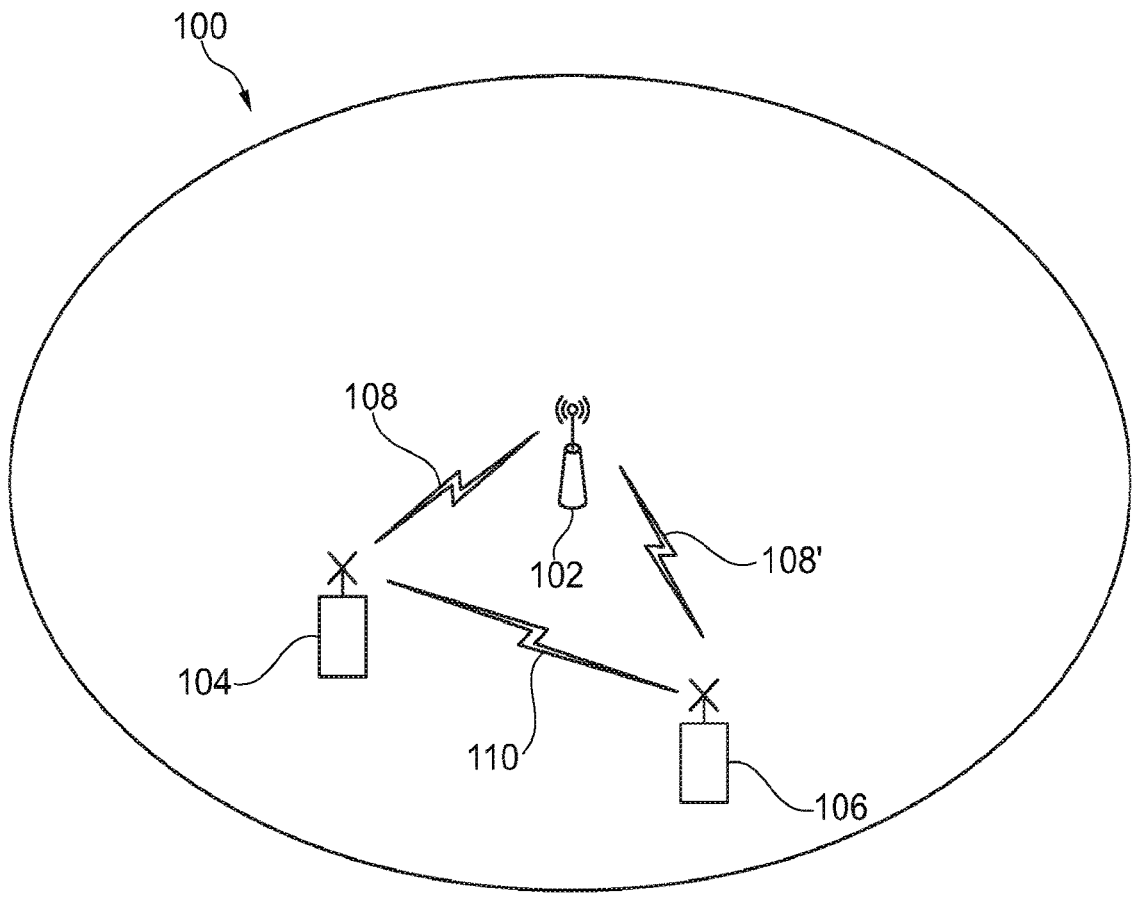
FIG. 1 is diagram of an example wireless network according to various embodiments.

Various aspects of the illustrative embodiments will be described using terms commonly employed by those skilled in the art to convey the substance of their work to others skilled in the art. However, it will be apparent to those skilled in the art that some alternate embodiments may be practiced using with portions of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details.

In other instances, well-known features are omitted or simplified in order to not obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware instructions and/or programs, a combinational logic circuit, and/or other suitable components that provide the described functionality.

The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, fixed or mobile client devices, relays, base stations, femtocells, gateways, bridges, hubs, routers, access points, or other network devices. Further, the radio systems within the scope of the invention may be implemented in cellular radiotelephone systems, satellite systems, two-way radio systems as well as computing devices including such radio systems including personal computers (PCs), tablets and related peripherals, personal digital assistants (PDAs), personal computing accessories, hand-held communication devices and all systems which may be related in nature and to which the principles of the inventive embodiments could be suitably applied.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) or long-term evolution-advanced (LTE-A) network such as an evolved universal mobile telecommunication system (UMTS) terrestrial radio access network (E-UTRAN).

The network 100 may include a base station, e.g., evolved node base station (eNB) 102, configured to wirelessly communicate with one or more mobile device(s) or terminal(s), e.g., first and second user equipment (UE) 104, 106. In various embodiments, the eNB 102 may be a fixed station (e.g., a fixed node) or a mobile station/node.

In various embodiments, the first UE 104 may be able to provide relaying functionality to forward data received from the eNB 102 to the second, remote, UE 106. Relay UE 108 communicates with the eNB 102 via a traditional Uu air interface 108, and with remote UE 106 via a sidelink interface 110. Remote UE 106 may also be able to communicate directly with the eNB 102 via Uu interface 108'.

Figure 2:
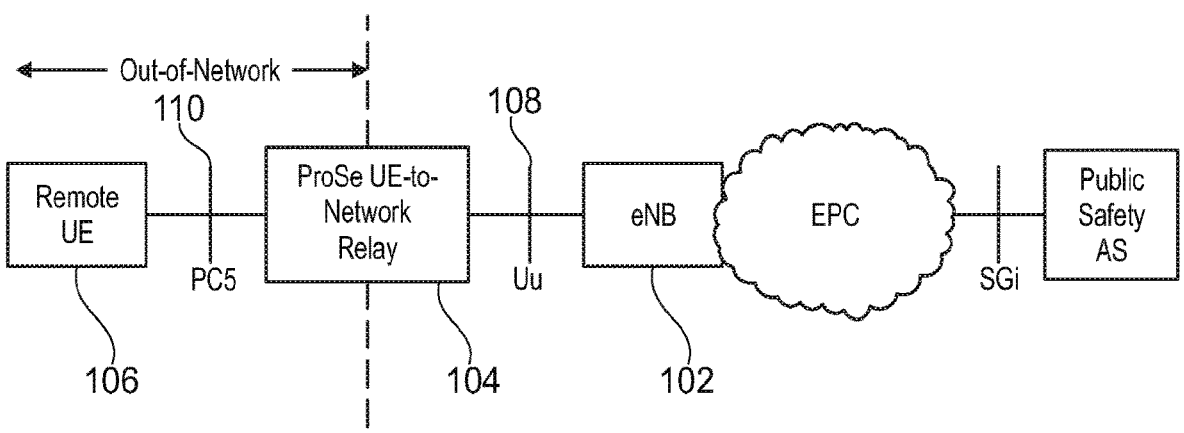
FIG. 2 is a block diagram showing the use of sidelink relaying for a public safety use case.

FIG. 2 is a block diagram showing the use of sidelink relaying for the public safety use case. As shown in FIG. 2, in the illustrated use case, the Remote UE 106 is generally considered out-of-coverage of the network 100, and in particular the eNB 102, and is utilizing relay support to access the network 100. The Remote UE 106 accesses the network via the relay UE 104 using an interface called the 'PC5' interface and the Proximity Services (ProSe) UE-to-Network Relay, which is shortly referred to as 'Relay UE' 104 throughout this document, connects to the network 100 using the legacy LTE Uu link.

The relay UE 104 is assumed to be in-coverage all the time. For implementations based on layer 3 (IP-based) relaying, such as that illustrated in FIG. 2, service continuity is dependent on the application level to be maintained, especially when IP address changes during relay change or direct to relay path change. This may cause complications when providing certain services via a relay link.

According to some embodiments, the introduced LTE ProSe framework may be further enhanced to support General use cases that may be of interest to operators with end users and may allow substantial improvements to network performance and user experience to be achieved. The ProSe framework design has been primarily focused on Public Safety services, while more General use cases had been considered as mainly out of scope. The Public Safety services determined the main design vectors in LTE Rel.12 ProSe framework targeting long-range broadcast communication which is robust to interference and has a relatively low peak data rate.

According to some embodiments, further enhancements to the device-to-device sidelink air-interface introduced as part of the ProSe framework may be also used for network optimization and have potential to improve user experience and increase the amount of services that can be provided. One of the more general use cases to which device-to-device (D2D) operation may be targeted is traffic management/offloading and utilization of its inherent multi-connectivity properties. Empowering sidelink air-interface and exploiting the new dimension of connectivity may bring additional benefits to mobile broadband and MTC applications, establishing principles of underlay network operation. Advanced relaying capability for UEs that are in coverage with the network, as described below according to some embodiments of the invention, may facilitate improvements in network efficiency, traffic switching delay reduction and other advantages. In some embodiments, the relay path may be switched dynamically (between direct and indirect links) and may also be able to support different paths for uplink and downlink directions. However, this flexible switching and asymmetric relay path selection are not feasible with L3 routing, at the IP-Layer currently provided in Rel-13.

According to some embodiments, relaying may be performed within L2 or the protocol stack. Embodiments outlined below illustrate details of the protocol architecture and mobility signaling for L2 relaying implementations.

Various embodiments of the invention may assume that the remote UE 106 to be served by a relay path is in coverage of the eNB 102, and that the remote UE 106 is in connected mode, or has been in connected mode such that the UE context is available in the eNB 102. This means that signaling radio bearers (SRBs) and data radio bearers (DRBs) and security are established between the Remote UE 106 and the eNB 102, and also that an S1 connection is established between the Remote UE and the eNB, and also an S1 connection is established between eNB and core network (MME and S-GW). Furthermore, it may be assumed that the Relay UE 104 remains in coverage of the eNB 102 for the duration of the relaying operation.

According to various embodiments, advanced relaying may be performed using a relay UE (a UE with certain relaying capabilities) via layer 2 routing. In release 13 LTE, as part of eProSe work item, basic layer 3 (L3) relay UE has been agreed upon and defined. Using a layer 2 routing concept according to some embodiments, the relaying may be performed either right above MAC in true L2 sense or above the LTE layer RLC (Radio Link Control). Example embodiments are described setting out:

Layer 2 based relaying techniques for a remote UE to send/receive data to/from the network via the relay Mobility related signaling when transitioning from direct path to relay path and vice versa; some variation using multiple relay UEs is also explained for the possibility when data could be potentially sent through more than one relay to increase the data rate of the UE (e.g. traffic offloading scenario)

Figure 3A:
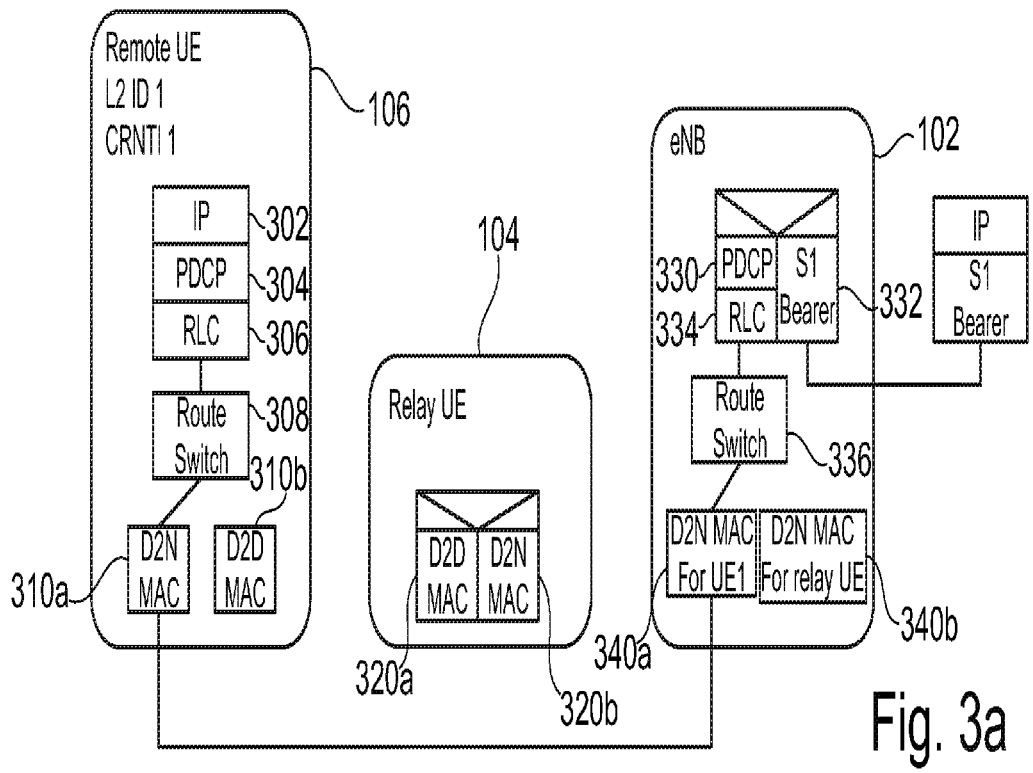
FIG. 3a is a block diagram of a protocol stack for L2 relaying above the MAC layer according to some embodiments.

FIG. 3a illustrates a protocol stack at the Remote UE 106, Relay UE 104 and eNB 102 to support forwarding or relaying of traffic within the Relay UE 104 just above the MAC layer according to some embodiments of the invention. FIG. 3a illustrates an arrangement in which the remote UE 106 communicates directly with the eNB 102 via the Uu interface 108'.

As illustrated in FIG. 3a, the remote UE 106 protocol stack comprises an IP layer 302 connected to a packet data convergence protocol (PDCP) layer 304, which is connected to a radio link control (RLC) layer 306. Packet data units (PDUs) provided by the RLC layer 306 are then directed by a route switch 308 to one of a device to network (D2N) MAC entity 310a and a device to device (D2D) MAC entity 310b. D2N MAC 310a provides a connection to the eNB 102 via a Uu air interface 108', while D2D MAC connects to relay UE 104 via the sidelink, PC5, interface 110.

Relay UE 104 is similarly provided with two MAC entities, D2D MAC 320a for communication with the remote UE 106 via the sidelink interface 110 and D2N MAC 320b for communication with the eNB 102 via the Uu interface 108.

FIG. 3a further illustrates the protocol stack of eNB 102 comprising a PDCP layer 330 that is coupled with the wider communication network via S1 bearer 322 and with RLC layer 334. RLC layer 334 is coupled to route switch 336 for directing PDUs to either a D2N MAC entity 340a for communication with the remote UE 106 via the Uu interface 108' or to a D2N MAC entity 340b for communication via a relay path through relay UE 104.

Figure 3B:
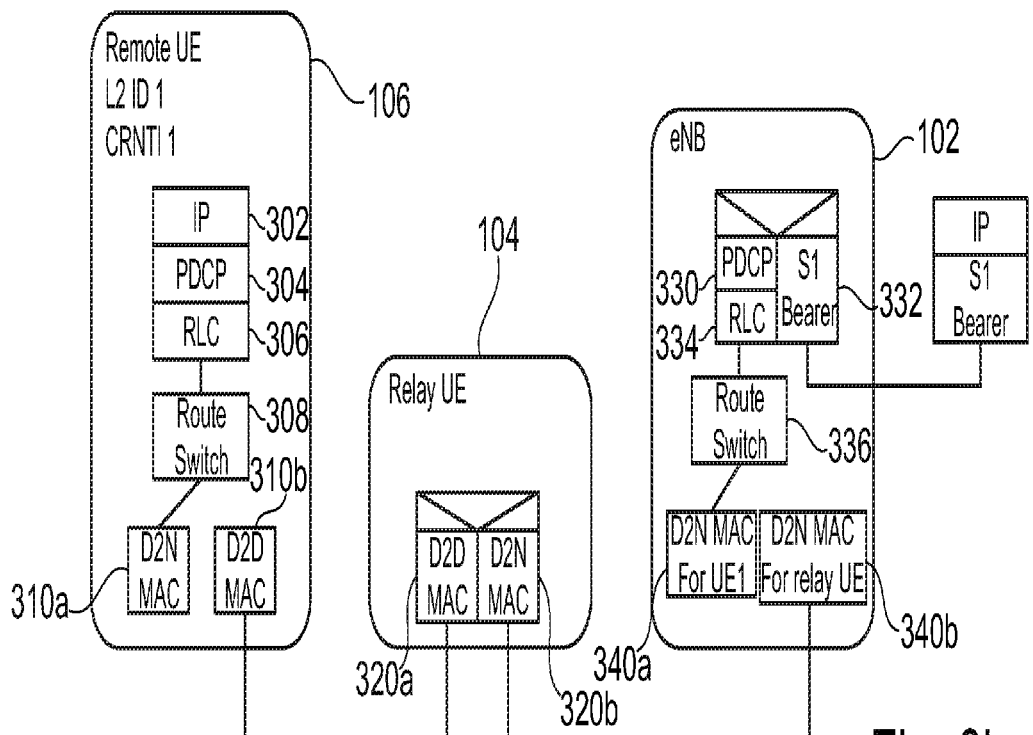
FIG. 3b is a block diagram of the protocol stack of FIG. 3a. showing relay routing according to some embodiments.

FIG. 3b illustrates the same arrangement as FIG. 3a where the communication path between the remote UE 106 and the eNB 102 is relayed via the relay UE 104. According to the illustrated protocol stack, in the Remote UE to network direction, MAC SDUs received on the PC5 interface 110 between the Remote UE 106 and the Relay UE 104 are directly submitted as MAC SDUs on the uplink (UL) of the Uu interface 108 between the Relay UE 104 and the eNB 102. In the network to Relay UE 104 direction, MAC SDUs received on the downlink (DL) of the Uu interface 108 between the eNB 102 and the Relay UE 104 are directly submitted as MAC SDUs on the PC5 interface 110 between the Relay UE 104 and the Remote UE 106. The relaying function may include a buffer to enable the MAC SDUs to be queued until a convenient time for transmission e.g. until resource is scheduled.

The Remote UE 106 and the eNB 102 include route switching functions 308, 336. In the Remote UE 106 the switching function 308 enables RLC PDUs (i.e. MAC SDUs) to be switched between the MAC used on the PC5 interface 110 (referred to as D2D (device to device) MAC 310a in the figure) and the MAC used on the Uu interface 108' (referred to as D2N (device to network) MAC 310b in the figure).

In the eNB 102 the switching function 336 enables RLC PDUs (i.e. MAC SDUs) to be switched between the MAC 340a used on the Uu interface 108' for the Remote UE 106 and the MAC 340b used on the Uu interface 108 for the Relay UE 104.

According to some embodiments, switching may be controlled by determining that the data arrives from a certain configured logical channel (and possibly if the remote UE 106 is configured for the transmission via the relay UE 104 or if the remote UE is already associated with the certain relay UE 104), the UE transmits the data through D2D MAC. Another example of switching may be if the UE is configured for the transmission via the relay UE 104 or if the UE 106 is already associated with the certain relay UE 104, the UE transmits the data through D2D MAC regardless from which logical channel data is arrived. A further example of switching may be to decide whether the data is transmitted through D2N MAC or D2D MAC entity on a packet by packet basis, determined using a packet filtering function. In FIG. 3a/3b, such a switching function may be located above the MAC, however embodiments of the invention are not restricted to the switching function being located above the MAC and other location may be used, e.g. the switch function may be located in an upper or lower layer.

FIG. 3a/3b shows a single Data Radio Bearer (DRB) in the Remote UE 106 and the eNB 102. However, it is possible to configure more than one DRB. If traffic is carried over the Uu interface 108' directly between the Remote UE 106 and eNB 102 then traffic associated with each DRB will be separated by use of different logical channel identities (LCIDs) within the MAC header. In the case that traffic is carried via the relay UE 104 then it may be necessary that the traffic associated with each DRB can still be separated. This may be achieved by use of a mapping between:

DRB identity;

Logical channel identity used on Uu interface 108' between eNB 102 and Remote UE 106 (i.e. on direct path);

Logical channel identity used on PC5 interface 110 between the Remote UE 106 and the Relay UE 104;

Logical channel identity used on Uu interface 108 between eNB 102 and Relay UE 104.

The eNB 102 may need to be aware of the mapping between all 4 identities, but the Remote UE 106 may only need to be aware of the mapping between 1/2/3 and the Relay UE 104 may only need to be aware of the mapping between 3/4. The mapping information may be configured in the Remote UE 106 and Relay UE 104 from the eNB 102 using, for example, the RRC Connection Reconfiguration procedure.

The embodiment illustrated in FIG. 3*a*/3*b* shows only a single remote UE 106 but it is possible that the Relay UE 104 may be engaged in relaying traffic for multiple Remote UEs. In this case the traffic associated with the different Remote UEs may needs to be separated in the Relay UE 104 and the eNB 102. This may be achieved by ensuring that the different Remote UEs are mapped to different logical channel identities on the Uu interface 108 between eNB 102 and Relay UE 104 (i.e. identity 4 in the list above may be unique among all the Remote UEs served by the Relay UE 104 and this identity has the purpose to identify the Remote UE 106 as well as to identity one DRB of that Remote UE). Alternatively, if logical channel identity is unique within one remote UE 106, the remote UE ID (e.g. C-RNTI or separate assigned L2 id to the remote UE 106 for routing purpose) of each MAC SDU may be included in MAC PDU header or MAC PDU subheader. This may then be used by the eNB 102 to map logical channel identity (2/3) to logical channel identity (4) in eNB side.

While the discussion above refers to DRBs, it will be recognized that it may apply equally to control plane traffic (i.e. RRC and NAS signaling) could also be carried via the relay path. This may be achieved by extending the approach above to including mapping information for Signaling Radio Bearer (SRB) identities as well as DRB identities.

Some of the characteristics of this approach to relaying traffic within the Relay UE just above the MAC layer may be:

- EPS Bearers may be carried by direct path or relay path. IP address preserved irrespective of which path is used to carry the traffic;
- Core network and upper protocol layers do not need to be aware that relaying is performed;
- Control plane SRBs may be carried via Relay UE;
- Security (provided within the PDCP layer) between remote UE and eNB is same irrespective of path (between Uu path and relay path or between one relay path and the other relay path) used to carry the traffic;
- Header compression (provided within the PDCP layer) between remote UE and eNB is same irrespective of path used;
- RLC operation between remote UE and eNB is enabled;
- RLC PDUs lost at direct/relay path switch or Relay UE change may be recovered by RLC;
- RLC PDU lost on either link is retransmitted on both links;
- RLC PDU size may be selected appropriately for both links as it may not be possible to change RLC PDU size at Relay UE. This may possibly lead to sub-optimal RLC PDU size on Uu interface;
- Remote UE and radio bearer may be identified on Uu interface by logical channel identity; and
- Many radio bearers carried over Uu interface. LCID space of the current LTE specification may not be sufficient and hence may need to be expanded.

Figure 4A:
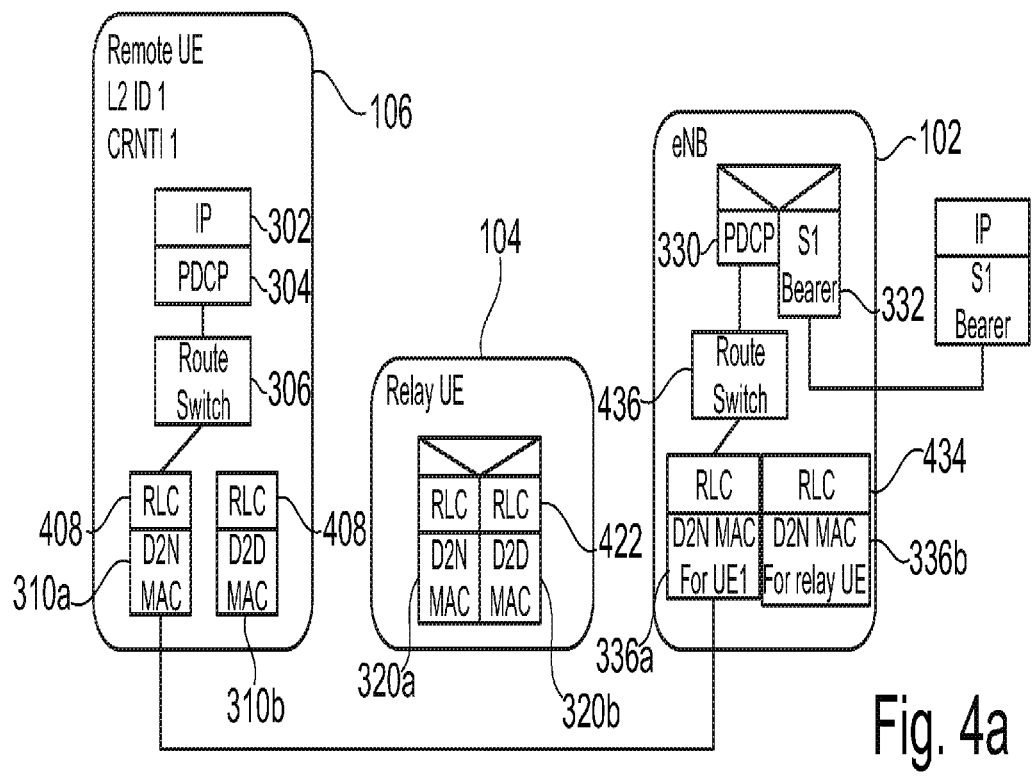
FIG. 4a is a block diagram of a protocol stack for L2 relaying above the RLC layer according to some embodiments.
Figure 4B:
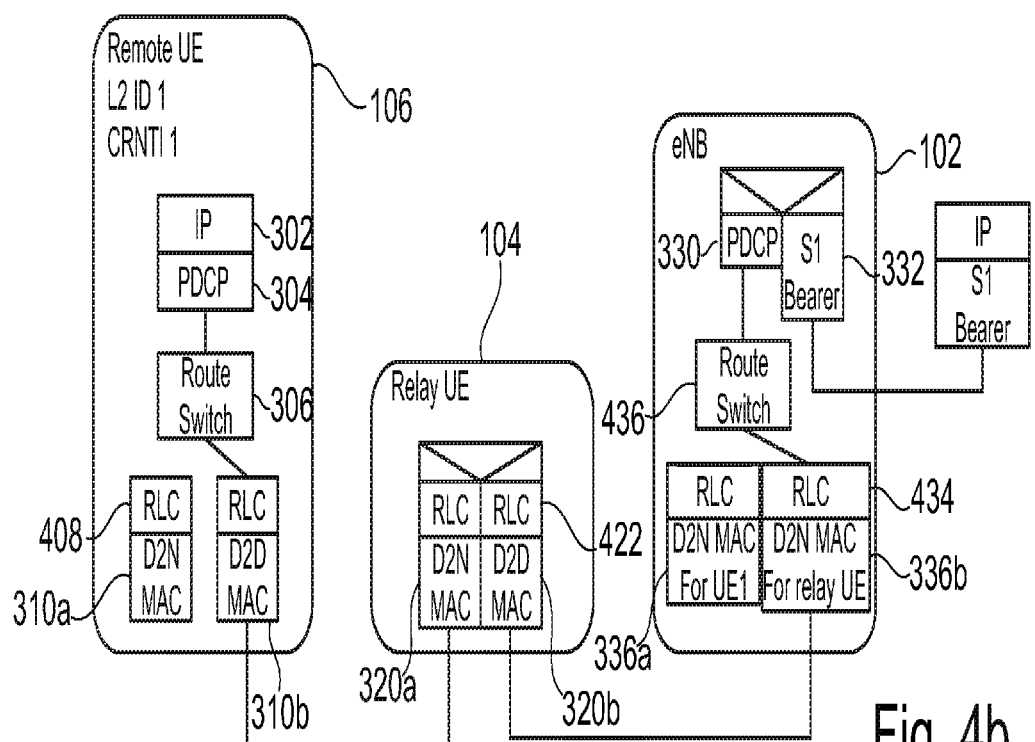
FIG. 4b is a block diagram of the protocol stack of FIG. 4a. showing relay routing according to some embodiments.

FIGS. 4*a* and 4*b* illustrate a protocol stack at the Remote UE 106, Relay UE 104 and eNB 102 similar to that illustrated in FIGS. 3*a*/3*b* but to support forwarding or relaying of traffic within the Relay UE 104 just above the RLC layer 422. Thus, in the illustrated example, in the Remote UE to network direction, RLC SDUs received on the PC5 interface 110 between the Remote UE 104 and the Relay UE 106 are directly submitted as RLC SDUs on the uplink (UL) of the Uu interface 108 between the Relay UE 104 and the eNB 102. In the network to Relay UE direction, RLC SDUs received on the downlink (DL) of the Uu interface 108 between the eNB 102 and the Relay UE 104 are directly submitted as RLC SDUs on the PC5 interface 110 between the Relay UE 104 and the Remote UE 102. The relaying function may not need to support any buffering as the RLC entity 422 below the relaying function has the ability to buffer data.

The Remote UE 106 and eNB 102 also include route switching functions 408, 436. These functions are similar to those described for the Relay above MAC option of FIGS. 3*a*/3*b*. However in the embodiment of FIGS. 4*a*/4*b* is that the route switching 408, 436 sits above the RLC layer 406, 434 instead of above the MAC.

The process of separate traffic of different DRBs (or SRBs) of a single Remote UE 106 and separating traffic of multiple Remote UEs served by the same Relay UE 104 is the same as that described for the Relay above MAC option (i.e. it relies on the use of logical channel identities)

The characteristics of this approach to relaying traffic within the Relay UE 104 just above the RLC layer 422 are the same as those described for the Relay above MAC option with the exception of the following:

- RLC PDUs lost at direct/relay path switch or Relay UE 104 change cannot be recovered by RLC;
- RLC PDU lost on either link is retransmitted only on that link; and
- RLC PDU size may be selected optimally for each link.

Figure 5A:
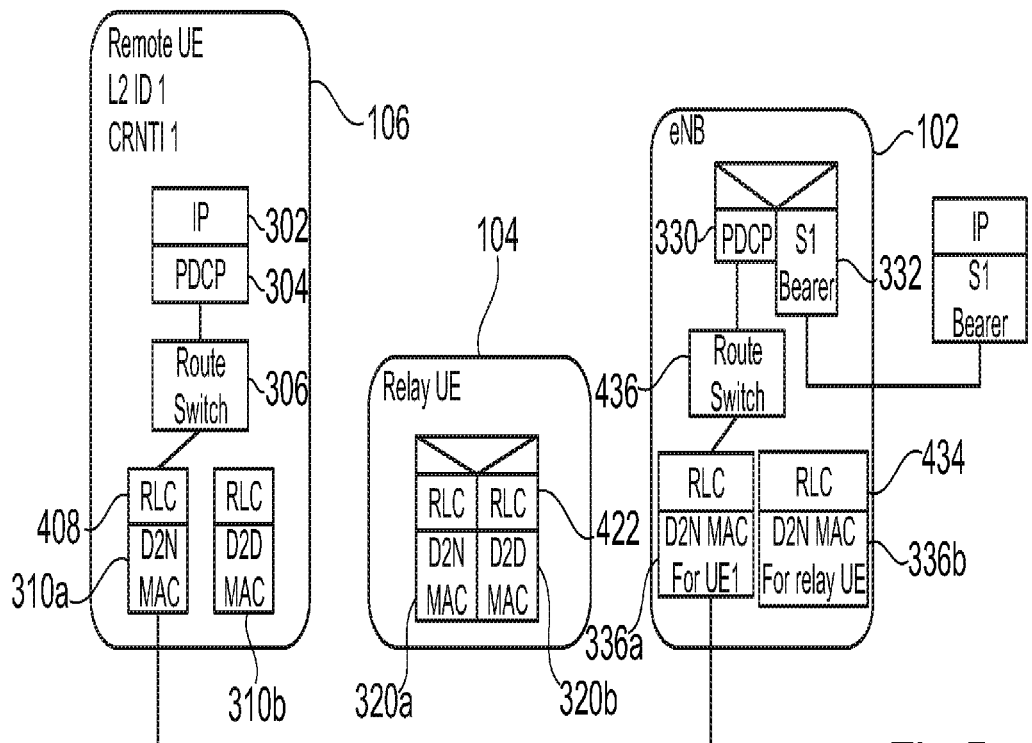
FIG. 5a is a block diagram of a protocol stack for L2 relaying above the RLC layer with a relaying protocol layer according to some embodiments.
Figure 5B:
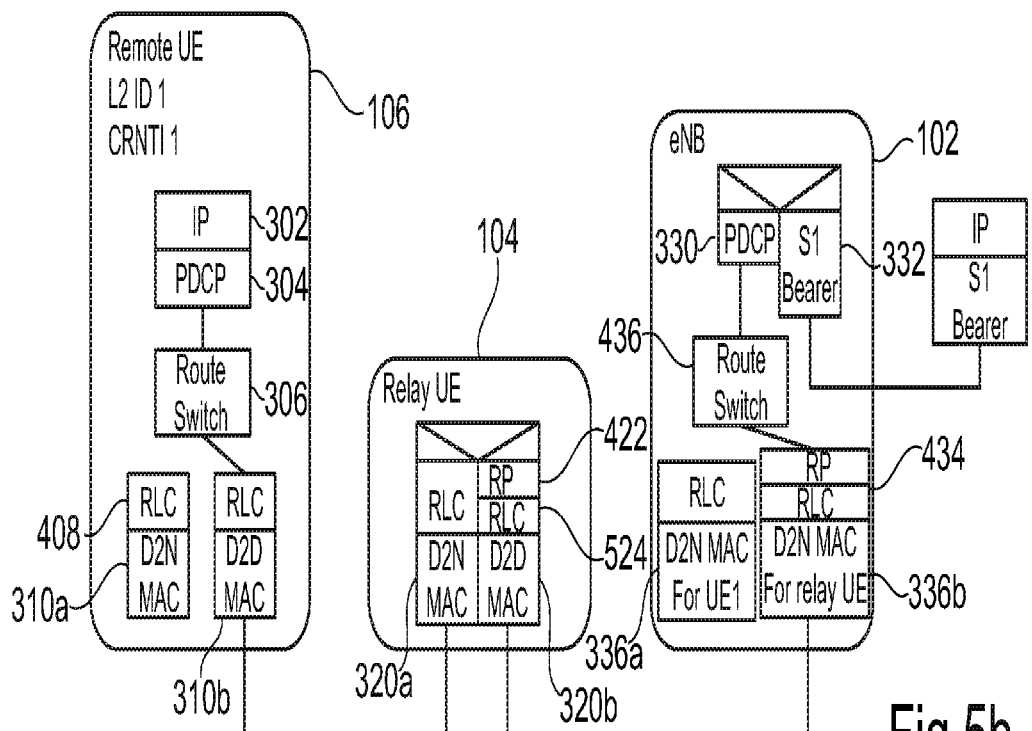
FIG. 5b is a block diagram of the protocol stack of FIG. 5a. showing relay routing according to some embodiments.

FIGS. 5*a* and 5*b* illustrate a protocol stack at the Remote UE 106, Relay UE 104 and eNB 102 similar to that illustrated in FIGS. 4*a*/4*b* to support forwarding or relaying of traffic within the Relay UE 104 above the RLC layer. In addition the protocol stack between the Relay UE 104 and the eNB 102 introduces an additional protocol layer which is referred to here as the Relay Protocol (RP) 524, 538. The purpose of the Relay Protocol is to multiplex traffic from multiple Remote UEs and also from multiple DRBs and SRBs of each Remote UE 106 onto a single radio bearer (or possibly a limited number of different radio bearers) between the Relay UE 104 and the eNB 102. The Relay Protocol may also provide a header that contains a Remote UE ID and DRB or SRB ID, so that the multiplexed traffic may be de-multiplexed at the receiving end.

Figure 6:
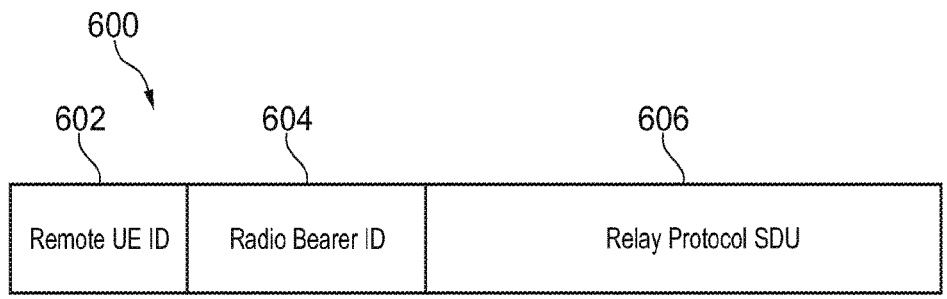
FIG. 6 Illustrates an example relay protocol packet data unit according to some embodiments.

FIG. 6 illustrates an example of the PDU format 600 of the Relay Protocol including a remote UE ID 602, a radio bearer ID 604, and a relay protocol SDU 606. The Remote UE ID 602 identifies the Remote UE 102. The field may identify the UE uniquely within the eNB 102 by carrying a combination of Cell Global Identity (CGI) and C-RNTI, or it may be a new type of RNTI allocated by the eNB, or it may be a Short ID that is sufficiently long to identify the Remote UE uniquely within the Remote UEs that are associated with a single Relay UE 104.

The benefit of Short ID may be that it introduces less overhead per RP PDU. In one variant of the PDU format, the Remote UE ID may be a Short ID, and an optionally present larger Remote UE ID (e.g. CGI+C-RNTI or new type of RNTI) may also be present. When the larger ID is present the receiving entity learns the association between the Short ID and the larger ID and then subsequent PDUs would not need to contain the larger ID.

The Radio Bearer ID 604 may contain a DRB ID or it may contain an EPS Bearer ID. If control plane signaling is also to be carried via the relay path then this field may also contain an SRB ID. If multiplexing data of multiple UEs is performed for the same QoS data and same radio bearer ID, radio bearer ID may be omitted.

The Relay Protocol SDU 606 may correspond to the RLC SDU that is to be carried between eNB and Remote UE.

In the Remote UE to network direction, RLC SDUs 606 received on the PC5 interface 110 between the Remote UE 106 and the Relay UE 104 are directly submitted as Relay Protocol SDUs 606 on the uplink (UL) of the Uu interface 108 between the Relay UE 104 and the eNB 102. The Relay Protocol adds the Remote UE ID 602 and SRB/DRB ID 604 into the header. In the network to Relay UE direction, Relay Protocol SDUs 606 received on the downlink (DL) of the Uu interface 108 between the eNB 102 and the Relay UE 104 are directly submitted as RLC SDUs 606 on the PC5 interface 110 between the Relay UE 104 and the Remote UE 106. The relaying function may not need to support any buffering as the RLC entity may have the ability to buffer data.

According to some embodiments, logical channel id may be used instead of radio bearer id in the above figure.

The characteristics associated with this approach to relaying traffic within the Relay UE 104 above the RLC layer and with the additional Relay Protocol 524 are the same as those described for the Relay above RLC option without the new Relay Protocol, with the exception of the following:

Multiplexing of multiple Remote UEs and multiple radio bearers onto one or a limited number of radio bearers on the Uu interface between Relay UE and eNB.

Consequently fewer radio bearer resources (e.g. fewer RLC entities and fewer LCID values) may be required. With this approach, therefore, would not need to expand the LCID space in the MAC header of the Uu interface.

Figure 7:
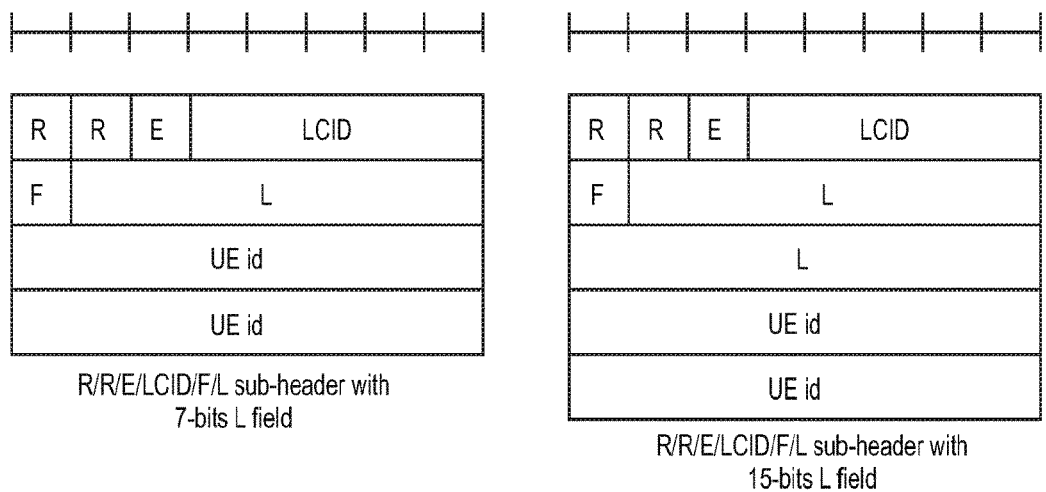
FIG. 7 illustrates a MAC subheader format according to some embodiments.

FIG. 7 illustrates a MAC subheader header format or MAC header format that may be used for a similar purpose to the relay protocol PDU format of FIG. 6. In the illustrated MAC sub-header formats of FIG. 7:

R: Reserved bit, set to "0" in LTE. However in order to add UE id field, one of reserved bit would be set to the value "1". The receiver will consider the above format if the corresponding R bit is set to "1".

E: The Extension field is a flag indicating if more fields are present in the MAC header or not. The E field is set to "1" to indicate another set of at least R/R/E/LCID fields.

F: The Format field indicates the size of the Length field (e.g. 7 bits field or 15 bits field)

L: The Length field indicates the length of the corresponding MAC SDU or variable-sized MAC control element in bytes.

LCID: The Logical Channel ID field identifies the logical channel instance of the corresponding MAC SDU or the type of the corresponding MAC control element or padding UE id: UE id identifies the remote UE. It may be either the remote UE's C-RNTI or its separate L2 id which is used for routing purpose.

Figure 8:
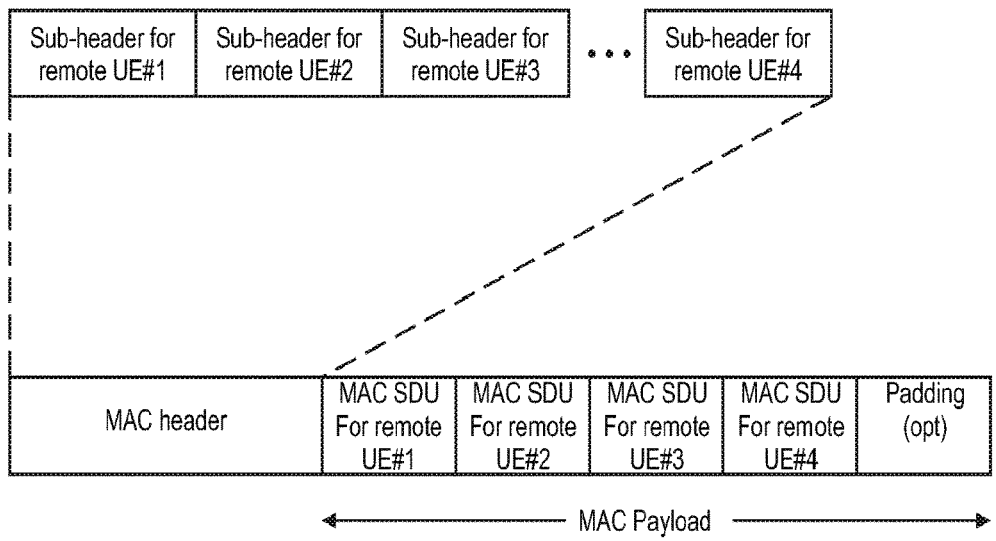
FIG. 8 illustrates a MAC packet data unit comprising the subheader format of FIG. 7 according to some embodiments.

FIG. 8 illustrates an example MAC PDU for relaying communications from multiple remote UEs using the MAC subheader format of FIG. 7.

According to some embodiments, the information of all subheaders for remote UEs may be included as part of MAC control information, e.g. in the above figure instead of using MAC subheader, information included in the subheader for remote UE#1, remote UE#2, remote UE#3, and remote UE#4 may be included into the new MAC control information element. In order to indicate this MAC control information element, the existing MAC subheader format may be reused with the new logical channel id, which newly to be defined to indicate this MAC control information element.

Although the function of RP 524 is located in the above RLC 422 in FIGS. 5*a*/5*b* and the corresponding description, this disclosure does not have any restriction for the RP location, e.g. according to some embodiments the RP function may be performed in above the RLC or below RLC or in the RLC.

Figure 9:
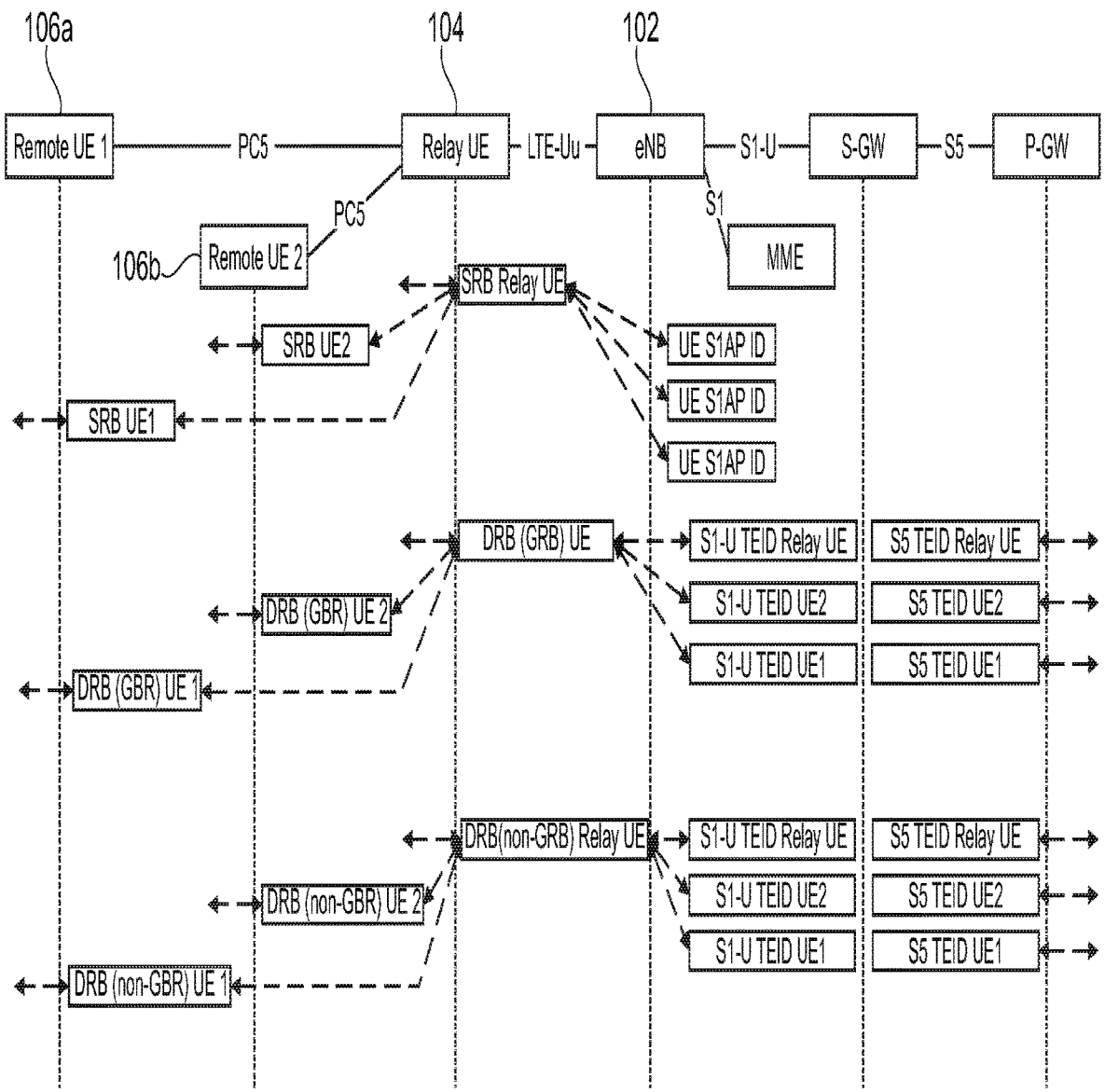
FIG. 9 illustrates multiplexing of traffic associated with multiple Remote UEs onto a limited number of radio bearers according to some embodiments.

FIG. 9 illustrates how the traffic associated with multiple Remote UEs may be multiplexed onto a single (or limited number of radio bearers) on the Uu interface 108 between the Relay UE 104 and the eNB 102. A small number of radio bearers on the Uu interface 108 may be useful to support some QoS differentiation. For example, three radio bearers could be configured on the Uu interface 108 with one carrying SRB signaling for all the Remote UEs, one carrying GBR (Guaranteed Bit Rate) QoS traffic for all the Remote UEs, and one carrying the non-GBR QoS traffic for all the Remote UEs.

Figure 10A:
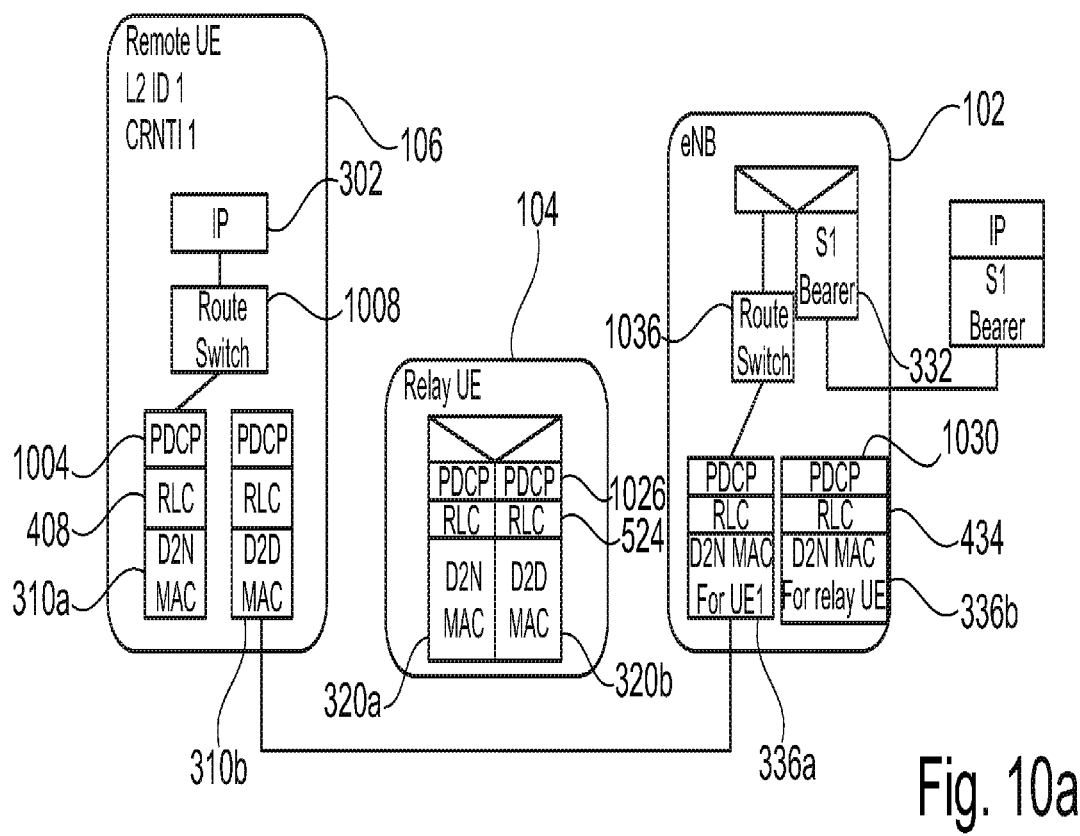
FIG. 10a is a block diagram of a protocol stack for layer 2 (L2) relaying above the PDCP layer according to some embodiments
Figure 10B:
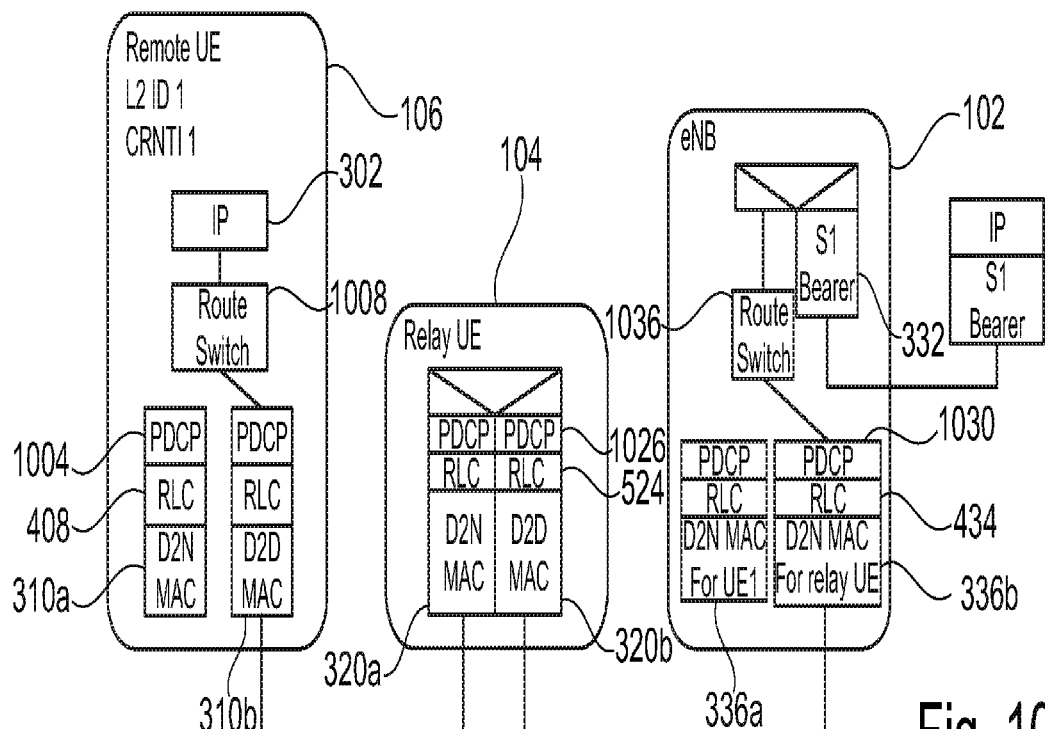
FIG. 10b is a block diagram of the protocol stack of FIG. 10a. showing relay routing according to some embodiments.

FIGS. 10*a*/10*b* illustrate a further protocol stack similar to that illustrated in FIGS. 3*a*/3*b* and FIGS. 4*a*/4*b* according to some embodiments of the invention. According to the protocol stack of FIG. 10*a*/10*b* the Remote UE, Relay UE and eNB support forwarding or relaying of traffic within the Relay UE 104 just above the PDCP layer 1026. This means that in the Remote UE to network direction, PDCP SDUs received on the PC5 interface 110 between the Remote UE 106 and the Relay UE 104 are directly submitted as PDCP SDUs on the uplink (UL) of the Uu interface 108 between the Relay UE 104 and the eNB 102. In the network to Relay UE direction, PDCP SDUs received on the downlink (DL) of the Uu interface 108 between the eNB 102 and the Relay UE 104 are directly submitted as PDCP SDUs on the PC5 interface 110 between the Relay UE 104 and the Remote UE 106. The relaying function may not need to support any buffering as the RLC entity below the relaying function has the ability to buffer data.

The Remote UE 106 and eNB 102 also include route switching functions 1008, 1036. These functions are similar to those described for the Relay above MAC option of FIGS. 3*a*/3*b*. The only difference is that the route switching sits above PDCP instead of above MAC.

The process of separating traffic of different DRBs (or SRBs) of a single Remote UE 106 and separating traffic of multiple Remote UEs served by the same Relay UE 104 is the same as that described for the Relay above MAC/RLC option (i.e. it relies on the use of logical channel identities)

Some of the characteristic of this approach to relaying traffic within the Relay UE just above the MAC layer are:

EPS Bearers may be carried by direct path or relay path. IP address preserved irrespective of which path is used to carry the traffic.

Core network and upper protocol layers do not need to be aware that relaying is performed.

Control plane SRBs could be carried via Relay UE.

Security (provided within the PDCP layer) at the remote UE should be changed upon the change of path.

Remote UE and radio bearer identified on Uu interface by logical channel identity Many radio bearers carried over Uu interface. LCID space of the current LTE specification may not be sufficient and hence may need to be expanded.

Similarly to the previously described L2 routing above RLC layer with relay protocol illustrated in FIGS. 5*a*/5*b*, according to some embodiments a relay protocol may be introduced above PDCP layer in the relay UE 106 and eNB 102. The relay protocol may facilitate multiplexing of multiple UEs/radio bearers over Uu interface 108 between the relay UE 104 and the eNB 102.

According to various embodiments of the invention, there is provided methods of signaling to support mobility of a remote UE and/or relay UEs. According to some embodiments, the remote UE 106 may be able to select a path to communicate with an eNB 102 from a plurality of available paths including a direct path between the remote UE 106 and the eNB 102 and at least one relay path via a relay UE 104. The remote UE 106 may then inform the eNB of the selected path, either via the direct path or the relay path.

Figure 11:
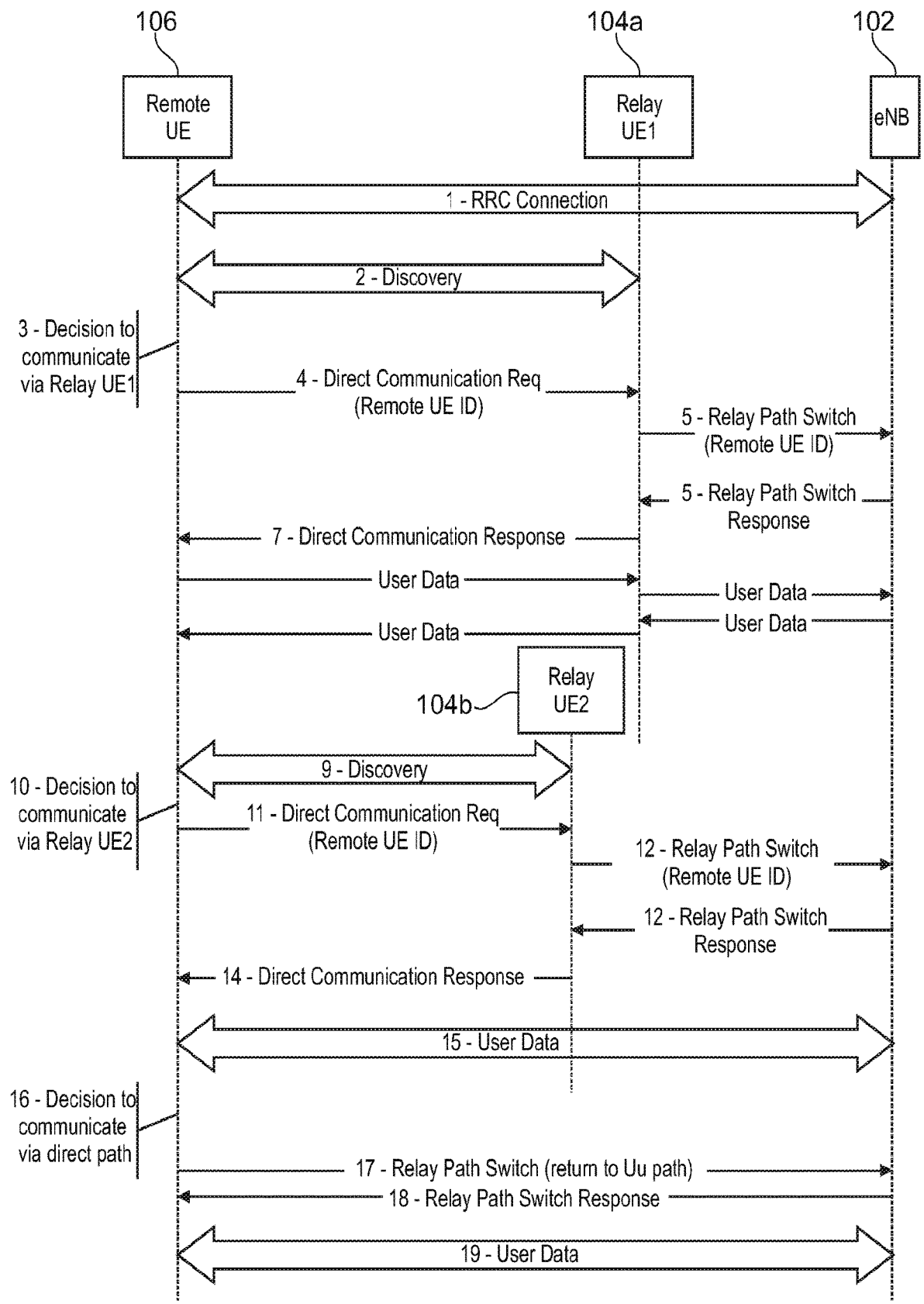
FIG. 11 is a sequence diagram of messaging for Remote UE initiated mobility related signaling according to some embodiments.

FIG. 11 illustrates an example message sequence chart for mobility related signaling between a remote UE 106, a first relay UE 104a, a second relay UE 104b and an eNB 102 for remote UE directed mobility. FIG. 11 illustrates the signaling involved as the Remote UE 106 initially communicates via a direct path with the eNB 102, then changes to an indirect path via Relay UE 1 104a, then to an indirect path via Relay UE 2 104b, and finally returns to using the direct path with the eNB 102. The elements of the sequence are described below:

1—The remote UE 106 establishes an RRC Connection with the eNB 102. The signaling used to establish this RRC Connection may be the same or similar to that for a current LTE system. As part of this connection establishment process the eNB 102 will allocate a temporary identity to the Remote UE 106. In a current LTE system this temporary identity is the 16 bit C-RNTI (Cell-Radio Network Temporary Identity) which may uniquely identify the UE 106 with a single cell. In a future LTE system it is possible that different and possibly larger temporary identity that may uniquely identify the UE 106 within an area larger than a cell may be allocated (for example, this may be referred to as an L-RNTI or Local-RNTI);

2—The Remote UE 106 discovers that it is in proximity of Relay UE 1 104a. The signaling used to perform this discovery may be the same or similar to that for a current LTE system, and may be based on Model A (where the Relay UE 104a periodically transmits an announcement message) or Model B discovery (where the Remote UE 106 transmits a solicitation message and any Relay UE 104 that receives this message responds);

3—The Remote UE 106 decides to switch communication path from the direct path 108' to an indirect path via Relay UE 1 104a. This decision may be made by the Remote UE 106, for example it may be based on signal level/or quality measurements of the direct link 108' to the eNB 102 and/or the link to Relay UE 1 104a, or the decision may be made by the eNB 102 and then communicated to the Remote UE 106 in a message that is not shown in the sequence;

4—The Remote UE 106 initiates establishment of a 1:1 communication with Relay UE 1 104a, by sending the Direct Communication Request message. This message includes the identity of the Remote UE 106 and this identity should be such that it can uniquely identify the Remote UE 106 globally. For example, it could be a combination of Cell Global Identity (CGI) and C-RNTI or it could be the Local-RNTI as mentioned in element 1. As another example, the physical cell id (PCI) may be added in addition to the remote UE id;

5—The Relay UE 1 104a informs the eNB 102 that Remote UE 106 is now associated with it. This is performed by sending a Relay Path Switch message, containing the same Remote UE ID as that received in element 4, to the eNB 102. The message may be an RRC protocol message. The eNB 102 now may now send data to the Remote UE 106 via Relay UE 1 104a;

6—The eNB 102 confirms receipt of the Relay Path Switch message by sending a Relay Path Switch Response message;

7—The Relay UE 1 104a confirms the establishment of the 1:1 communication with the Remote UE 106 by sending a Direct Communication Response. This message may include additional information related to the configuration of the 1:1 communication link;

8—User data may now be transferred, in either direction, between the Remote UE 106 and eNB 102 via Relay UE 1 104a;

9—The Remote UE 106 discovers that it is in proximity of Relay UE 2 104b. The discovery procedures may be the same as those described in element 2;

10—The Remote UE 106 decides to switch communication path from the indirect path with Relay UE 1 104a to an indirect path via Relay UE 2 104b. This decision may be made by the Remote UE 106, for example it may be based on signal level/or quality measurements of the direct link 108' to the eNB 102, the link to Relay UE 1 104a, and/or the link with Relay UE 2 104b. Alternatively, the decision may be made by the eNB 102 and then communicated to the Remote UE 106 in a message that is not shown in the sequence;

11-15—these elements are the same as those described in 4-8 but involving Relay UE 2 104a;

16—The Remote UE 106 decides to switch communication path from the indirect path with Relay UE 2 104b back to a direct path with the eNB 102. As for previous path decisions, this decision may be made by the Remote UE 106, for example it may be based on signal level/or quality measurements of the direct link 108' to the eNB 102, the link to Relay UE 1 104a, and/or the link with Relay UE 2 104b. Alternatively, the decision may be made by the eNB 102 and then communicated to the Remote UE 106 in a message that is not shown in the sequence;

17—The Remote UE 106 sends a Relay Path Switch message to the eNB 102, containing an indication the user data is to be switched back to the direct path 108'. This may be an RRC message;

18—The eNB 102 confirms receipt of the Relay Path Switch message by sending a Relay Path Switch Response message to the remote UE 106; and 19—User data may now be transferred, in either direction, using the direct path 108' with the eNB 102.

The sequence shown in FIG. 11 is an example implementation and variations to the sequence are possible. For example, some variations are described below:

The approach illustrated in FIG. 11 assumes that the network to Remote UE traffic path and the Remote UE to network traffic path (i.e. downlink and uplink paths) are the same.

However, according to some embodiments the approach may be extended to support different traffic paths in the uplink and downlink directions. For example, the network to Remote UE traffic may be routed via a relay but the Remote UE to network traffic may be carried on the direct Uu interface path. To achieve this the messages sent at elements 4 and 5, 11 and 12, and 17 may be extended to indicate whether it applied to network to Remote UE direction of traffic only, Remote UE to network direction of traffic only, or both directions of traffic.

The approach illustrated in FIG. 11 assumes that only a single Relay UE 104 is used at any time. However, according to some embodiments the approach may be extended to support more than one Relay UE at the same time. The UE may establish a connection with more than one Relay UE and then decide on a more dynamic basis (e.g. every few 100 ms or in the most extreme case every packet) the path on which to route the Remote UE to network direction of traffic. Similarly, in the eNB it may decide on a dynamic basis the path on which to route the network to Remote UE direction of traffic. The possible paths would include the direct Uu interface path as well as indirect paths via the one or more Relay UEs. The possible Relay UEs that may be used for routing traffic may be referred to as a 'Relay UE candidate set'.

The approach illustrated in FIG. 11 used explicit control plane signaling between the Relay UE and the eNB to inform the eNB about a new traffic path (i.e. shown in the figure as the Relay Path Switch messages). Similarly, explicit control plane signaling is used at element 17 when the UE returns to using the direct Uu interface path. According to some embodiments, this explicit signaling may be avoided by the eNB interpreting a first packet received from the remote UE via a new path as an implicit path switch message. If a change in both remote UE to network and network to remote UE is desired (as per initial configuration exchange), then, the first packet from remote UE via the new path may be used as a trigger.

According to some embodiments, the remote UE may send a notification to the relay UE over the PC5 interface that it wishes to switch the specific traffic identified by a given ID and the relay UE may indicate to the eNB over the Uu interface for path switching.

Some embodiments of the invention may handle RLC AM bearer after selection of new relay UE (e.g. relay UE#2) as follows. This may be applicable to RLC AM bearer after switching between the direct path (transmission/reception directly between the remote UE and the eNB) and the relay path (transmission/reception via the relay UE):

In the direction from the eNB to the remote UE, the eNB may transmit PDCP SDUs based on reporting by the remote UE after selection of new relay UE (e.g. relay UE#2). The reporting by the remote UE may indicate PDCP SDUs which were transmitted successfully in the old relay UE (e.g. relay UE#1) with the corresponding PDCP SDU SN and PDCP SDUs which has not been transmitted successfully in the old relay UE with the corresponding PDCP SDU SN.

In the direction from the remote UE to the eNB, the remote UE may re-transmit to the new relay UE all UL PDCP SDUs starting from the first PDCP SDU following the last consecutively confirmed PDCP SDU, i.e. the oldest PDCP SDU that has not been acknowledged at RLC in the old relay UE.

The approach illustrated in FIG. 11 used explicit control plane signaling between the Relay UE and the eNB to inform the eNB about a new traffic path (i.e. shown in the figure as the Relay Path Switch messages). Similarly, explicit control plane signaling is used at element 17 when the UE returns to using the direct Uu interface path. According to some embodiments, this explicit signaling could be avoided if the eNB interprets a first packet received from the remote UE via a new path as an implicit path switch message. If a change in both remote UE to network and network to remote UE is desired (as per initial configuration exchange), then, the first packet from remote UE via the new path may be used as a trigger.

According to some embodiments, once the remote UE associated with the new relay UE, there may be signaling either by the remote UE or the eNB during or after path switch to let the old relay UE know that, so the old relay UE releases the corresponding remote UE context and forward the data PDU to the new relay UE if needed. This would be also applicable for the case after switching from relay UE#2 to direct link (between the eNB and the remote UE). In addition to this explicit signaling, the relay UE maintains a kind of inactivity timer to release the remote UE context since the signaling by the remote UE is not always guaranteed (e.g. the radio link failure case).

According to some embodiments, the eNB 102 may be able to select a traffic path from a plurality of available paths including a direct path between the remote UE 106 and the eNB 102 and at least one relay path via a relay UE 104. The eNB 102 may then inform the remote UE 106 and relay UE 104 of the selected path.

Figure 12:
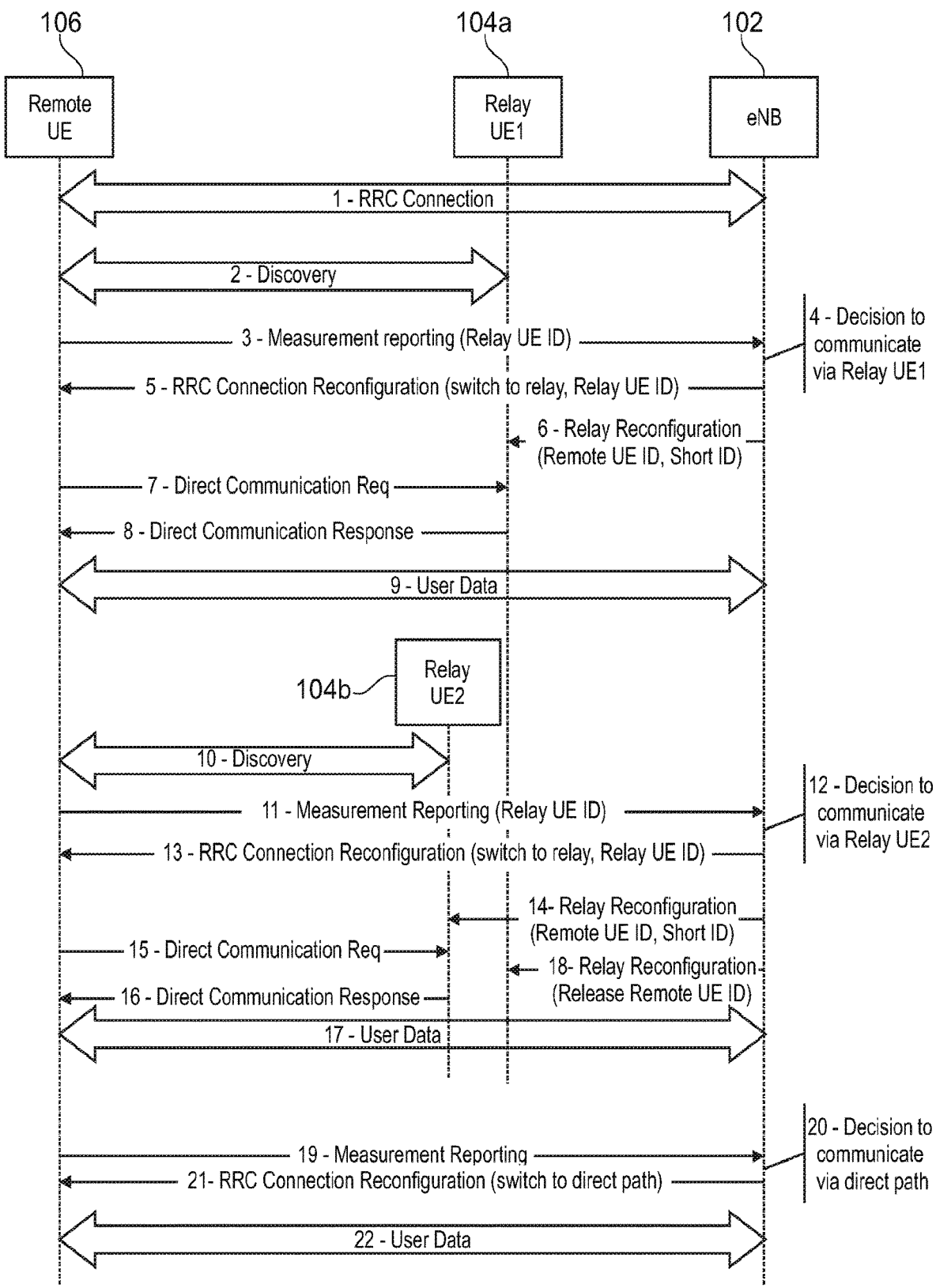
FIG. 12 is a sequence diagram of messaging for eNB initiated mobility related signaling according to some embodiments.

FIG. 12 illustrates an example message sequence chart for mobility related signaling between a remote UE 106, a first relay UE 104*a*, a second relay UE 104*b* and an eNB 102 for eNB 102 directed mobility. FIG. 12 illustrates the signaling involved as the Remote UE 106 initially communicates via the direct path with the eNB 102, then changes to an indirect path via Relay UE 1 104*a*, then to an indirect path via Relay UE 2 104*b*, and finally returns to using the direct path with the eNB 102. The elements of the sequence are described below:

1—The remote UE 106 establishes an RRC Connection with the eNB 102. The signaling used to establish this RRC Connection may be the same or similar to that for a current LTE system.

2—The Remote UE 106 discovers that it is in proximity of Relay UE 1 104*a*. The signaling used to perform this discovery may be the same or similar to that for a current LTE system, and may be based on Mode A (where the Relay UE periodically transmits an announcement message) or Model B discovery (where the Remote UE transmits a solicitation message and any Relay UE that receives this message responds).

3—The Remote UE 106 performs measurement reporting to the eNB 102. The reported measurement will at least include an indication that the remote UE 106 has discovered Relay UE 1 104*a* and the identity of Relay UE 1. The reporting measurements may also include measurements of the signal level/or quality of the direct link to the eNB 102 and/or the link to Relay UE 1. Configuration parameters to control the measurement reporting may have been previously provided by the eNB 102 to the Remote UE 106.

4—The eNB 102 decides that the remote UE 106 is to switch communication path from the direct path 108' to an indirect path via Relay UE 1 104*a*. This decision may be made based on the information contained in the measurement report, measurements taken by the eNB 102, and other information internal to the eNB such as traffic load, etc.

5—The eNB 102 sends a message (e.g. an RRC Connection Reconfiguration message) to the Remote UE 106. This message contain a command that the Remote UE should switch its traffic to a relay UE with the Relay UE ID indicated in the message. The Remote UE may send a response message (e.g. an RRC Connection Reconfiguration Complete message) to confirm successful receipt of the command—this is not shown on the figure.

6—The eNB 102 sends a message (e.g. an RRC Relay Reconfiguration message) to the Relay UE 1 104*a*. This message informs the Relay UE to expect traffic from the Remote UE 106, and provides a Short ID to be used to identify traffic from the Remote UE within the Relay Protocol header. The Relay UE 1 may send a response message (e.g. an RRC Relay Reconfiguration Complete message) to confirm successful receipt of the command—this is not shown on the figure. In some embodiments, the order of element 5 and element 6 may be changed.

7—The Remote UE 106 initiates establishment of a 1:1 communication with Relay UE 1 104a, by sending the Direct Communication Request message. This message includes the identity of the Remote UE.

8—The Relay UE 1 104a confirms the establishment of the 1:1 communication with the Remote UE 106 by sending a Direct Communication Response. This message may include additional information related to the configuration of the 1:1 communication link.

According to some embodiments, element 7 and element 8 may be skipped.

That means if the remote UE 106 receives a configuration message from the eNB 102 (i.e. element 5), the remote UE 106 may start transmission/reception data via the relay UE (i.e. element 9)

9—User data may now be transferred, in either direction, between the Remote UE 106 and eNB 102 via Relay UE 1 104a

10—The Remote UE 106 discovers that it is in proximity of Relay UE 2 104b. The discovery procedures may be the same as those described in element 2.

11—The Remote UE 106 performs measurement reporting to the eNB 102. The reported measurement now includes an indication that the UE has discovered Relay UE 2 104b and the identity of Relay UE 2. The reporting measurements may also include measurements of the signal level/or quality of the direct link to the eNB 102, the link to Relay UE 1, and/or the link to Relay UE 2.

12-17—these elements are the same as those described in 4-9 but involving Relay UE 2 104b. In some embodiments, the order of element 13 and element 14 may be changed. In some embodiments, element 15 and element 16 may be skipped. That means if the remote UE 106 receives configuration message by the eNB (i.e. element 13), the remote UE may start transmission/reception data via the relay UE (i.e. element 17)

18—The eNB 102 sends a message (e.g. an RRC Relay Reconfiguration message) to the Relay UE 1 104a to inform it to stop relaying traffic for the Remote UE 106. The Relay UE1 104a may release its connection with the Remote UE and release the mapping between the Remote UE ID and the Short ID. The Remote UE 106 may send a response message (e.g. an RRC Relay Reconfiguration Complete message) to confirm successful receipt of the command—this is not shown on the figure.

19—The Remote UE 106 continues to perform measurement reporting to the eNB 102 to provide update measurement information on the signal strength/quality of the links to the Relay UEs and the direct link to the eNB 102.

20—The eNB 102 decides to switch traffic back to the direct path 108'. This decision may be based on measurements reported from the Remote UE 106, measurements performed by the eNB and eNB internal information.

21—The eNB 102 sends a message (e.g. an RRC Connection Reconfiguration message) to the Remote UE 106. This message may contain a command that the Remote UE 106 should switch its traffic back to the direct path 108'. The Remote UE may send a response message (e.g. an RRC Connection Reconfiguration Complete message) to confirm successful receipt of the command—this is not shown on FIG. 12.

22—User data may now be transferred, in either direction, using the direct path with the eNB 102.

The sequence shown in FIG. 12 is an example implementation and in some embodiments variations to the sequence are possible. For example, some variations are described below:

The approach illustrated in FIG. 12 assumes that the network to Remote UE traffic path and the Remote UE to network traffic path are the same. However, in some embodiments the approach may be extended to support different traffic paths in the two directions, for example the network to Remote UE traffic may be routed via a relay but the Remote UE to network traffic may be carried on the direct Uu interface path. To achieve this the messages sent at elements 5, 13 and 21, and in some embodiments 6 and 14, may have to be extended to indicate whether they apply to network to Remote UE direction of traffic only, Remote UE to network direction of traffic only, or both directions of traffic as eNB controls the path switching.

The approach illustrated in FIG. 12 assumes that only a single Relay UE is used at any time. However, in some embodiments the approach could easily be extended to support more than one Relay UE at the same time as shown in FIG. 12. The remote UE 106 could be directed to establish relay connection with more than one Relay UE and then decide on a more dynamic basis (e.g. every few 100 ms or in the most extreme case every packet) the path on which to route the traffic. The possible Relay UEs that may be used for routing traffic may be referred to as a 'Relay UE candidate set'. The possible paths would include the direct Uu interface path as well as the indirect paths via the one or more Relay UEs. If we used explicit control plane signaling between the Relay UE and the eNB 102 as well as remote UE and eNB for making the path switch, then a significant signaling overhead may be created for the multiple relay UE case (especially if done for every packet). In order to mitigate this, the following solutions/optimizations may be applied:

If the Remote UE 106 is receiving traffic from network, and the eNB 102 determines the need to support high data rate for the remote UE, it could pre-configure or provide an a priori configuration of a number of relay UEs in remote UE's vicinity as well as pre-configure the remote UE 106 to be capable of receiving traffic on PC5 interface 110 from multiple relay UEs (they could be configured to send data to the same resource pool to read from). Supporting traffic from network to remote UE via a given relay UE may be done quite transparently with pre-configuration.

As long as the eNB 102 allows it in its configuration, uplink traffic from remote UE to the eNB/network may also be dynamically sent via any of the relay UEs from the candidate relay UE set with a suitable L2 routing protocol (e.g. above MAC, above RLC, above PDCP).

According to some embodiments RLC AM bearer control after selection of new relay UE (e.g. relay UE#2) may be as follows. According to some embodiments this may be also applicable to RLC AM bearer after switching between the direct path (transmission/reception directly between the remote UE and the eNB) and the relay routed path (transmission/reception via the relay UE)

In the direction from the eNB to the remote UE, the eNB transmits PDCP SDUs based on reporting by the remote UE after selection of new relay UE (e.g. relay UE#2). The reporting by the remote UE will indicate PDCP SDUs which were transmitted successfully in the old relay UE (e.g. relay UE#1) with the corresponding PDCP SDU SN and PDCP SDUs which has not been transmitted successfully in the old relay UE with the corresponding PDCP SDU SN.

In the direction from the remote UE to the eNB, the remote UE re-transmits in the new relay UE all UL PDCP SDUs starting from the first PDCP SDU following the last consecutively confirmed PDCP SDU, i.e. the oldest PDCP SDU that has not been acknowledged at RLC in the old relay UE.

Figure 13:
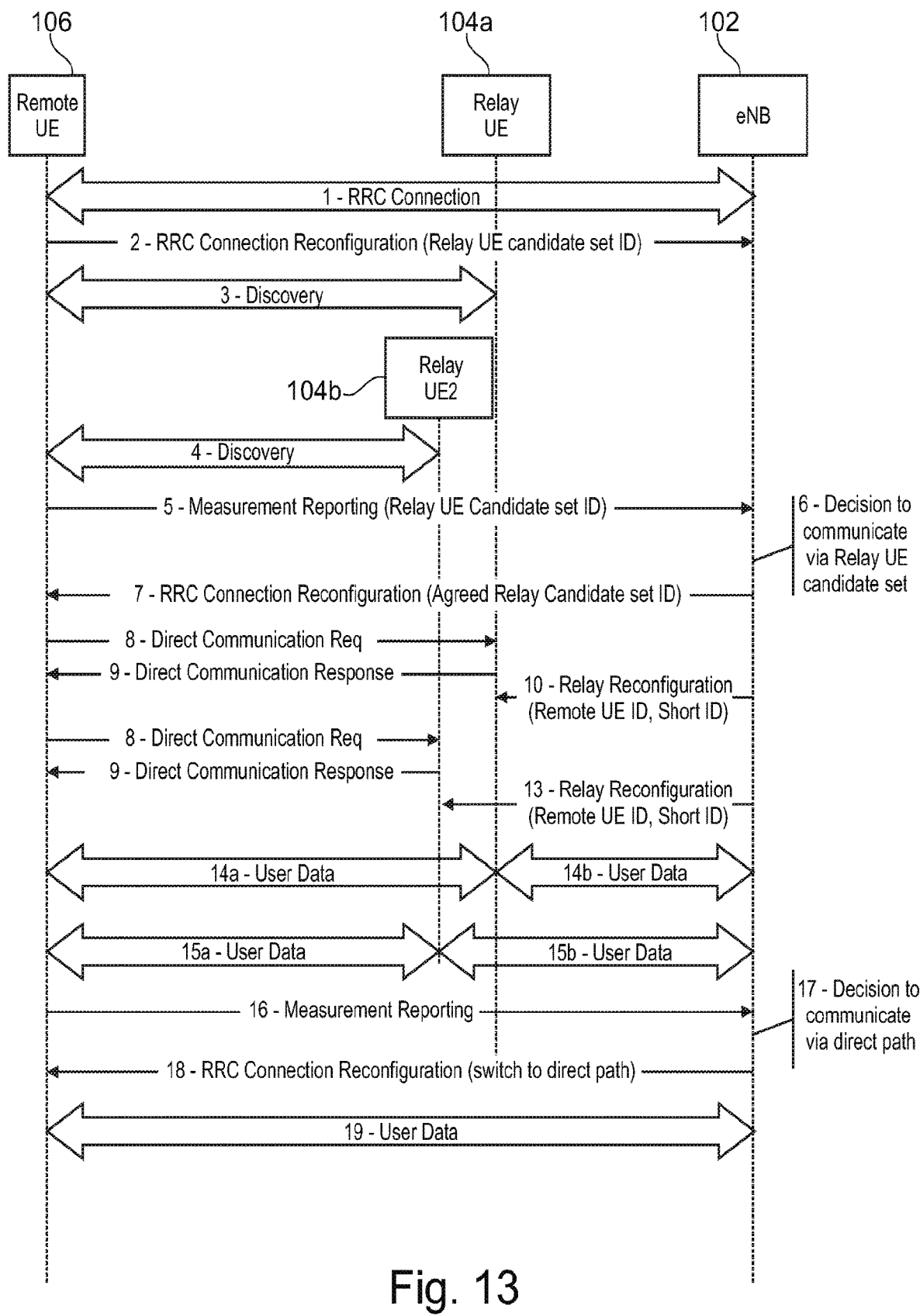
FIG. 13 is a sequence diagram of messaging for eNB initiated mobility related signaling with pre-configuration according to some embodiments.

FIG. 13 illustrates an example message sequence chart for mobility related signaling between a remote UE 106, a first relay UE 104a, a second relay UE 104b and an eNB 102 for eNB 102 directed mobility for embodiments implementing pre-configured relay UEs and/or remote UEs as described above.

Throughout the disclosure, the term eNB may loosely refer to a cell or RAN (Radio Access Network) node or transmission point (TP). The relay UE may belong to the same or different eNB or entity. When it belongs to different entity than the direct path of the remote UE, then additional signaling and context transfer might need to happen for the remote UE to switch between the direct path and relay UE path. Furthermore, the remote UE may be receiving data from multiple relay UEs, each associated with the same eNB/entity or different eNB/entity than the remote UE itself.

Figure 14:
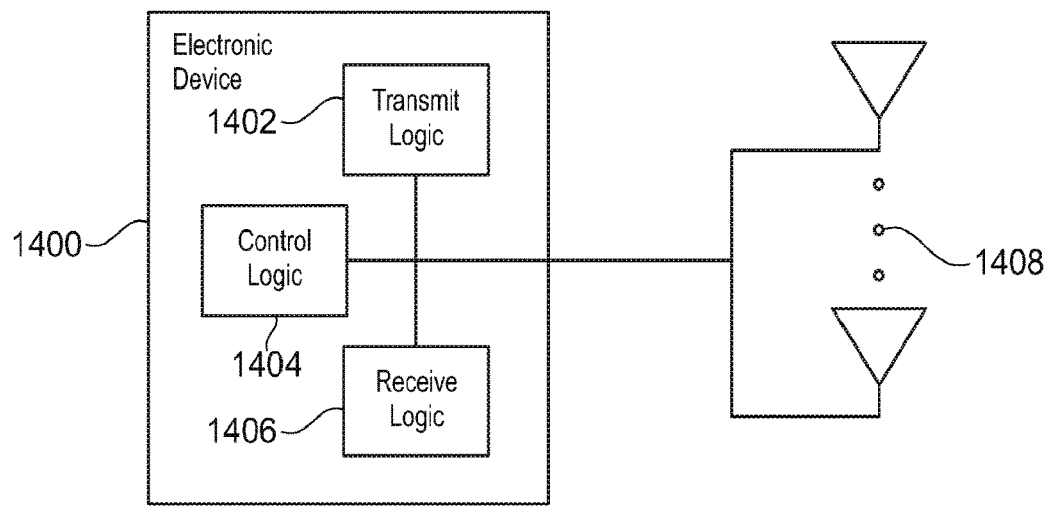
FIG. 14 is a block diagram of an electronic device operable to implement some embodiments.

FIG. 14 illustrates an electronic device 1400 that may be, or may be incorporated into or otherwise part of, an eNB 102, a UE 104, 106, or some other type of electronic device in accordance with various embodiments. Specifically, the electronic device 1400 may be logic and/or circuitry that may be at least partially implemented in one or more of hardware, software, and/or firmware. In embodiments, the electronic device logic may include radio transmit logic 1402 and receive logic 1406 coupled to control logic 1404. In embodiments, the transmit 1402 and/or receive logic 1406 may be elements or modules of transceiver logic, as shown. The electronic device 1400 may be coupled with or include one or more plurality of antenna elements 1408 of one or more antennas. The electronic device 1400 and/or the components of the electronic device may be configured to perform operations similar to those described elsewhere in this disclosure.

As used herein, the term "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. Specifically, the logic may at be at least partially implemented in, or an element of, hardware, software, and/or firmware. In some embodiments, the electronic device logic may be implemented in, or functions associated with the logic may be implemented by, one or more software or firmware modules. In some embodiments, the electronic device of FIG. 14 may be configured to perform one or more processes or methods such as processes or methods described herein.

Figure 15:
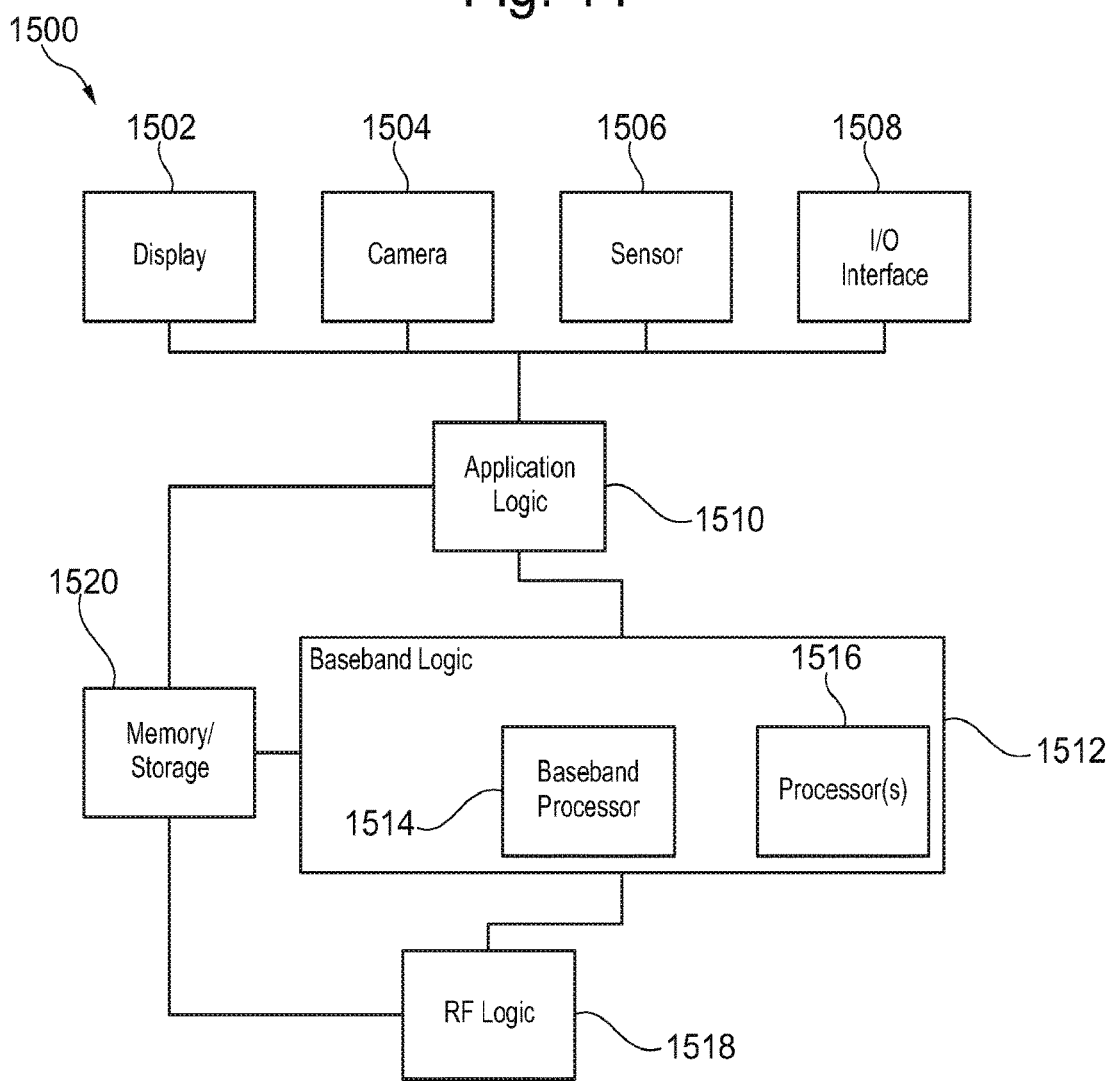
FIG. 15 is a block diagram of an example system operable to implement some embodiments.

Embodiments described herein may be implemented into a system using any suitably configured hardware and/or software. FIG. 15 illustrates, for one embodiment, an example system 1500 comprising radio frequency (RF) logic 1518, baseband logic 1512, application logic 1510, memory/storage 1512, display 1502, camera 1504, sensor 1506, and input/output (I/O) interface 1508, coupled with each other at least as shown.

The application logic 1510 may include one or more single-core or multi-core processors. The processor(s) may include any combination of general-purpose processors and dedicated processors (e.g., graphics processors, application processors, etc.). The processors may be coupled with memory/storage and configured to execute instructions stored in the memory/storage to enable various applications and/or operating systems running on the system.

The baseband logic 1512 may include one or more single-core or multi-core processors. The processor(s) may include a baseband processor 1514 and/or additional or alternative processors 1516 that may be designed to implement functions or actions of the control logic 1404, transmit logic 1402, and/or receive logic 1406 described elsewhere herein. The baseband logic 1512 may handle various radio control functions that enables communication with one or more radio networks via the RF logic. The radio control functions may include, but are not limited to, signal modulation, encoding, decoding, radio frequency shifting, etc. In some embodiments, the baseband logic 1512 may provide for communication compatible with one or more radio technologies. For example, in some embodiments, the baseband logic may support communication with an evolved universal terrestrial radio access network (EUTRAN) and/or other wireless metropolitan area networks (WMAN), a wireless local area network (WLAN), a wireless personal area network (WPAN). Embodiments in which the baseband logic is configured to support radio communications of more than one wireless protocol may be referred to as multi-mode baseband logic.

In various embodiments, baseband logic 1512 may include logic to operate with signals that are not strictly considered as being in a baseband frequency. For example, in some embodiments, baseband logic 1512 may include logic to operate with signals having an intermediate frequency, which is between a baseband frequency and a radio frequency.

RF logic 1518 may enable communication with wireless networks using modulated electromagnetic radiation through a non-solid medium. In various embodiments, the RF logic may include switches, filters, amplifiers, etc. to facilitate the communication with the wireless network.

In various embodiments, RF logic 1518 may include logic to operate with signals that are not strictly considered as being in a radio frequency. For example, in some embodiments, RF logic 1518 may include logic to operate with signals having an intermediate frequency, which is between a baseband frequency and a radio frequency.

In various embodiments, transmit logic 1402, control logic 1404, and/or receive logic 1406 discussed or described herein may be embodied in whole or in part in one or more of the RF logic 1518, the baseband logic 1512, and/or the application logic 1510. As used herein, the term "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. Specifically, the logic may at be at least partially implemented in, or an element of, hardware, software, and/or firmware. In some embodiments, the electronic device logic may be implemented in, or functions associated with the logic may be implemented by, one or more software or firmware modules.

In some embodiments, some or all of the constituent components of the baseband logic 1512, the application logic 1510, and/or the memory/storage 1520 may be implemented together on a system on a chip (SOC).

Memory/storage 1520 may be used to load and store data and/or instructions, for example, for system. Memory/storage for one embodiment may include any combination of suitable volatile memory (e.g., dynamic random access memory (DRAM)) and/or non-volatile memory (e.g., Flash memory).

In various embodiments, the I/O interface 1508 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments sensor 1506 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband logic 1512 and/or RF logic 1518 to communicate with components of a positioning network, e.g., a global positioning system (GPS) satellite.

In various embodiments, the display 1502 may include a display (e.g., a liquid crystal display, a touch screen display, etc.).

In various embodiments, the system 1500 may be a mobile computing device such as, but not limited to, a laptop computing device, a tablet computing device, a netbook, an Ultrabook, a smartphone, etc. In various embodiments, system may have more or less components, and/or different architectures.

For example, in some embodiments the RF logic 1518 and/or the baseband logic 1512 may be embodied in communication logic (not shown). The communication logic may include one or more single-core or multi-core processors and logic circuits to provide signal processing techniques, for example, encoding, modulation, filtering, converting, amplifying, etc., suitable to the appropriate communication interface over which communications will take place. The communication logic may communicate over wireline, optical, or wireless communication mediums. In embodiments in which the system is configured for wireless communication, the communication logic may include the RF logic and/or baseband logic to provide for communication compatible with one or more radio technologies. For example, in some embodiments, the communication logic may support communication with an evolved universal terrestrial radio access network (EUTRAN) and/or other wireless metropolitan area networks (WMAN), a wireless local area network (WLAN), a wireless personal area network (WPAN). Embodiments of the technology herein may be described as related to the third generation partnership project (3GPP) long term evolution (LTE) or LTE-advanced (LTE-A) standards. For example, terms or entities such as eNodeB (eNB), mobility management entity (MME), user equipment (UE), etc. may be used that may be viewed as LTE-related terms or entities. However, in other embodiments the technology may be used in or related to other wireless technologies such as the Institute of Electrical and Electronic Engineers (IEEE) 802.16 wireless technology (WiMax), IEEE 802.11 wireless technology (WiFi), various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed. In those embodiments, where LTE-related terms such as eNB, MME, UE, etc. are used, one or more entities or components may be used that may be considered to be equivalent or approximately equivalent to one or more of the LTE-based terms or entities.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 16:
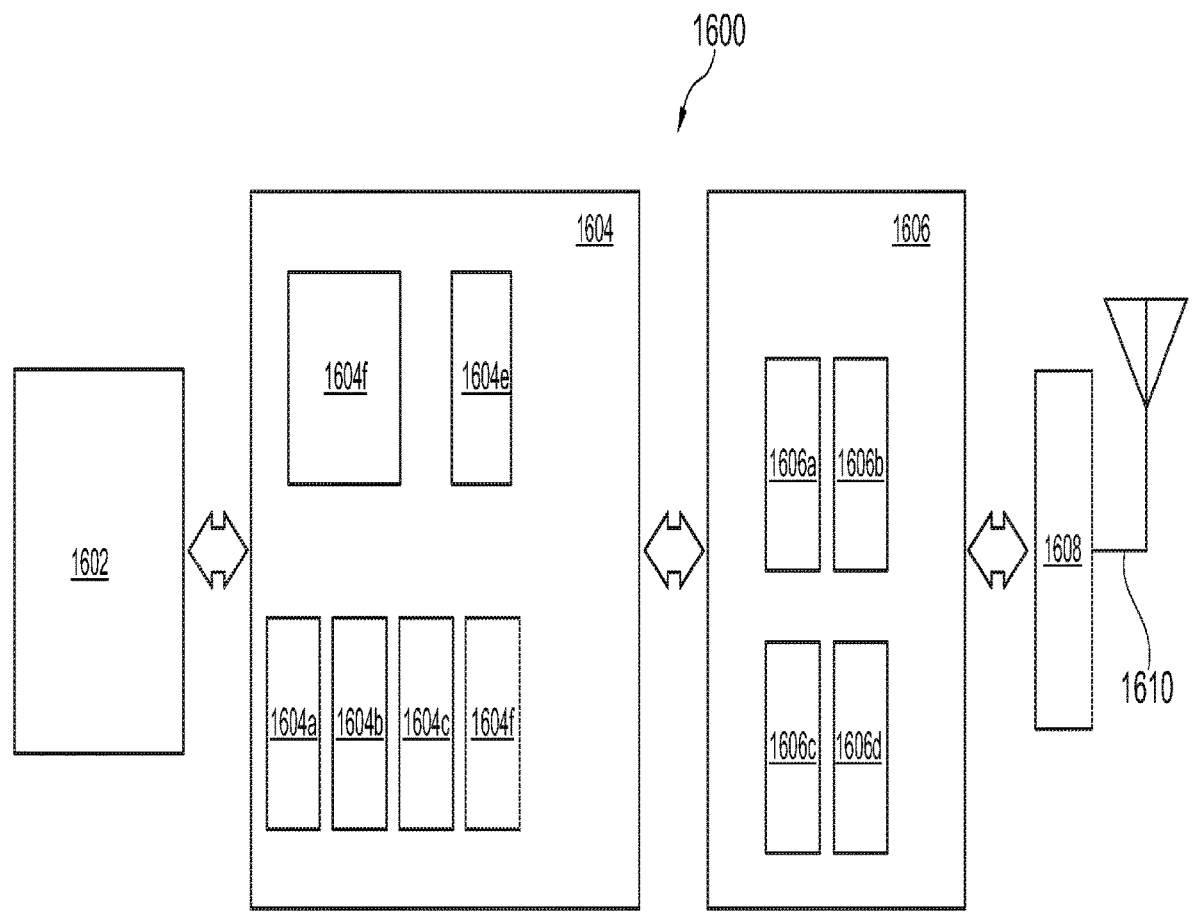
FIG. 16 is a block diagram of an example User Equipment device operable to implement some embodiments.

Embodiments described herein may be implemented into a system using any suitably configured hardware and/or software. FIG. 16 illustrates, for one embodiment, example components of a User Equipment (UE) device 1600. In some embodiments, the UE device 1600 may include application circuitry 1602, baseband circuitry 1604, Radio Frequency (RF) circuitry 1606, front-end module (FEM) circuitry 1608 and one or more antennas 1610, coupled together at least as shown.

The application circuitry 1602 may include one or more application processors. For example, the application circuitry 1602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1604 may include circuitry such as, but not limited to, one or more single-core or multi-core processors. The baseband circuitry 1604 may include one or more baseband processors and/or control logic to process baseband signals received from a receive signal path of the RF circuitry 1606 and to generate baseband signals for a transmit signal path of the RF circuitry 1606. Baseband processing circuitry 1604 may interface with the application circuitry 1602 for generation and processing of the baseband signals and for controlling operations of the RF circuitry 1606. For example, in some embodiments, the baseband circuitry 1604 may include a second generation (2G) baseband processor 1604*a*, third generation (3G) baseband processor 1604*b*, fourth generation (4G) baseband processor 1604*c*, and/or other baseband processor(s) 1604*d* for other existing generations, generations in development or to be developed in the future (e.g., fifth generation (5G), 6G, etc.). The baseband circuitry 1604 (e.g., one or more of baseband processors 1604*a-d*) may handle various radio control functions that enable communication with one or more radio networks via the RF circuitry 1606. The radio control functions may include, but are not limited to, signal modulation/demodulation, encoding/decoding, radio frequency shifting, etc. In some embodiments, modulation/demodulation circuitry of the baseband circuitry 1604 may include Fast-Fourier Transform (FFT), precoding, and/or constellation mapping/demapping functionality. In some embodiments, encoding/decoding circuitry of the baseband circuitry 1604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1604 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1604e of the baseband circuitry 1604 may be configured to run elements of the protocol stack for signaling of the PHY, MAC, RLC, PDCP and/or RRC layers. In some embodiments, the baseband circuitry may include one or more audio digital signal processor(s) (DSP) 1604f. The audio DSP(s) 104f may be include elements for compression/decompression and echo cancellation and may include other suitable processing elements in other embodiments.

Components of the baseband circuitry may be suitably combined in a single chip, a single chipset, or disposed on a same circuit board in some embodiments. In some embodiments, some or all of the constituent components of the baseband circuitry 1604 and the application circuitry 1602 may be implemented together such as, for example, on a system on a chip (SOC).

In some embodiments, the baseband circuitry 1604 may provide for communication compatible with one or more radio technologies. For example, in some embodiments, the baseband circuitry 1604 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1604 is configured to support radio communications of more than one wireless protocol may be referred to as multi-mode baseband circuitry.

RF circuitry 1606 may enable communication with wireless networks using modulated electromagnetic radiation through a non-solid medium. In various embodiments, the RF circuitry 1606 may include switches, filters, amplifiers, etc. to facilitate the communication with the wireless network. RF circuitry 1606 may include a receive signal path which may include circuitry to down-convert RF signals received from the FEM circuitry 1608 and provide baseband signals to the baseband circuitry 1604. RF circuitry 1606 may also include a transmit signal path which may include circuitry to up-convert baseband signals provided by the baseband circuitry 1604 and provide RF output signals to the FEM circuitry 1608 for transmission.

In some embodiments, the RF circuitry 1606 may include a receive signal path and a transmit signal path. The receive signal path of the RF circuitry 1606 may include mixer circuitry 1606a, amplifier circuitry 1606b and filter circuitry 1606c. The transmit signal path of the RF circuitry 1606 may include filter circuitry 1606c and mixer circuitry 1606a. RF circuitry 1606 may also include synthesizer circuitry 1606d for synthesizing a frequency for use by the mixer circuitry 1606a of the receive signal path and the transmit signal path. In some embodiments, the mixer circuitry 1606a of the receive signal path may be configured to down-convert RF signals received from the FEM circuitry 1608 based on the synthesized frequency provided by synthesizer circuitry 1606d. The amplifier circuitry 1606b may be configured to amplify the down-converted signals and the filter circuitry 1606c may be a low-pass filter (LPF) or band-pass filter (BPF) configured to remove unwanted signals from the down-converted signals to generate output baseband signals. Output baseband signals may be provided to the baseband circuitry 1604 for further processing. In some embodiments, the output baseband signals may be zero-frequency baseband signals, although this is not a requirement. In some embodiments, mixer circuitry 1606a of the receive signal path may comprise passive mixers, although the scope of the embodiments is not limited in this respect. In some embodiments, the mixer circuitry 1606a of the transmit signal path may be configured to up-convert input baseband signals based on the synthesized frequency provided by the synthesizer circuitry 1606d to generate RF output signals for the FEM circuitry 1608. The baseband signals may be provided by the baseband circuitry 1604 and may be filtered by filter circuitry 1606c. The filter circuitry 1606c may include a low-pass filter (LPF), although the scope of the embodiments is not limited in this respect.

In some embodiments, the mixer circuitry 1606a of the receive signal path and the mixer circuitry 1606a of the transmit signal path may include two or more mixers and may be arranged for quadrature downconversion and/or upconversion respectively. In some embodiments, the mixer circuitry 1606a of the receive signal path and the mixer circuitry 1606a of the transmit signal path may include two or more mixers and may be arranged for image rejection (e.g., Hartley image rejection). In some embodiments, the mixer circuitry 1606a of the receive signal path and the mixer circuitry 1606a may be arranged for direct downconversion and/or direct upconversion, respectively. In some embodiments, the mixer circuitry 1606a of the receive signal path and the mixer circuitry 1606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1606 may include analog-to-digital converter (ADC) and digital-to-analog converter (DAC) circuitry and the baseband circuitry 1604 may include a digital baseband interface to communicate with the RF circuitry 1606.

In some dual-mode embodiments, a separate radio IC circuitry may be provided for processing signals for each spectrum, although the scope of the embodiments is not limited in this respect.

In some embodiments, the synthesizer circuitry 1606d may be a fractional-N synthesizer or a fractional N/N+1 synthesizer, although the scope of the embodiments is not limited in this respect as other types of frequency synthesizers may be suitable. For example, synthesizer circuitry 1606d may be a delta-sigma synthesizer, a frequency multiplier, or a synthesizer comprising a phase-locked loop with a frequency divider.

The synthesizer circuitry 1606d may be configured to synthesize an output frequency for use by the mixer circuitry 1606a of the RF circuitry 1606 based on a frequency input and a divider control input. In some embodiments, the synthesizer circuitry 1606d may be a fractional N/N+1 synthesizer.

In some embodiments, frequency input may be provided by a voltage controlled oscillator (VCO), although that is not a requirement. Divider control input may be provided by either the baseband circuitry 1604 or the applications processor 1602 depending on the desired output frequency. In some embodiments, a divider control input (e.g., N) may be determined from a look-up table based on a channel indicated by the applications processor 1602.

Synthesizer circuitry 1606d of the RF circuitry 1606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 1606 may include an IQ/polar converter.

FEM circuitry 1608 may include a receive signal path which may include circuitry configured to operate on RF signals received from one or more antennas 1610, amplify the received signals and provide the amplified versions of the received signals to the RF circuitry 1606 for further processing. FEM circuitry 1608 may also include a transmit signal path which may include circuitry configured to amplify signals for transmission provided by the RF circuitry 1606 for transmission by one or more of the one or more antennas 1610.

In some embodiments, the FEM circuitry 1608 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1606). The transmit signal path of the FEM circuitry 1608 may include a power amplifier (PA) to amplify input RF signals (e.g., provided by RF circuitry 1606), and one or more filters to generate RF signals for subsequent transmission (e.g., by one or more of the one or more antennas 1610.

In embodiments, the implemented wireless network may be a 3rd Generation Partnership Project's long term evolution (LTE) advanced wireless communication standard, which may include, but is not limited to releases 8, 9, 10, 11 and 12, or later, of the 3GPP's LTE-A standards.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

EXAMPLES

Example 1 may include a User Equipment or (UE) that is ProSe-enabled and capable to communicate to the network either through direct communication over Uu type of link or through a configured UE-to-Network Relay (such a UE is referred to as remote UE) over PC5 interface Example 2 may include the remote UE of example 1 or some other example herein, wherein the remote UE is capable of route switching over layer 2 (MAC) MAC SDUs over PC5 to the MAC entity of the Uu interface of the relay UE Example 3 may include the remote UE of example 1 or some other example herein, wherein the remote UE is capable of mapping using its own DRB ID and LCID of Uu between eNB and remote UE and LCID of PC5 between remote UE and relay UE Example 4 may include the remote UE of example 1 or some other example herein, wherein the remote UE is capable of including its ID (remote UE ID) within the MAC PDU header to aid in mapping along with the LCID information by the eNB Example 5 may include the remote UE of example 1 or some other example herein, wherein the remote UE is capable of route switching RLC PDUs over PC5 to the MAC of on the Uu interface of the relay UE Example 6 may include the remote UE of example 1 or some other example herein, wherein the remote UE is capable of route switching PDCP SDUs over PC5 to the MAC of the relay UE for transporting over its Uu interface.

Example 7 may include the remote UE of example 1 or some other example herein, whose ID is included in the new relay protocol header defined as CGI+C-RNTI or a new a type of RNTI or some form of a short ID learnt over a period of time.

Example 8 may include the remote UE of example 1 or some other example herein, wherein the remote UE is capable of adding the physical cell ID (PCI) to its own defined temporary or other ID as part of its communication message towards the relay UE.

Example 9 may include the remote UE of example 1 or some other example herein, wherein the remote UE is capable of letting the old relay UE aware of its mobility to new relay UE through signaling after path switching to the new relay UE.

Example 10 may include the remote UE of example 1 or some other example herein, wherein the remote UE is capable of sending its ID within the MAC subheader as part of the MAC PDU.

Example 11 may include the remote UE of example 1 or some other example herein, wherein the remote UE is capable of re-transmitting to the new relay UE all UL PDCP SDUs starting from the first PDCP SDU following the last consecutively confirmed PDCP SDU, i.e. the oldest PDCP SDU that has not been acknowledged at RLC in the old relay UE while moving from one relay UE or node to another relay or node.

Example 12 may include a relay user equipment (UE) capable of mapping using LCID of Uu between eNB and relay UE and LCID of PC5 between remote UE and relay UE Example 13 may include the relay UE of example 12 or some other example herein, wherein the relay UE is capable of supporting a new relay protocol layer above RLC to multiplex SRB and DRB from multiple remote UEs onto a single new radio bearer Example 14 may include the relay UE of example 13 or some other example herein, wherein the relay UE is capable of adding a new header including the SRB/DRB ID and remote UE ID to de-multiplex the traffic Example 15 may include the relay UE of example 12 or some other example herein, wherein the relay UE is capable of receiving the MAC PDU from remote UE with the MAC subheader containing the remote UE ID.

Example 16 may include the relay UE of example 12 or some other example herein, wherein the relay UE is capable of sending a control message e.g. RRC message such as relay path switch to the eNB/network while switching remote UE's path from relay path to direct path or vice versa for remote UE controlled mobility.

Example 17 may include the relay UE of example 12 or some other example herein, wherein the relay UE is capable of receiving a control message such as relay reconfiguration from the eNB/network containing the remote UE ID (and potentially short ID) for eNB-originated mobility signaling Example 18 may include the relay UE of example 12 or some other example herein, wherein the relay UE is capable of multiplexing remote UEs with similar QoS or similar DRB IDs which means the DRB ID need not be included in the MAC PDU Example 19 may include the relay UE of example 12 or some other example herein, wherein the relay UE is capable of releasing the remote UE upon certain inactivity timer Example 20 may include an evolved NodeB (eNB) or similar network node which may support ProSe D2D communication along with relay operation and configure certain UEs to act as UE-to-Network relays (relay UEs) and send or receive communication from such relays.

Example 21 may include the eNB of example 20 or some other example herein, wherein the eNB is capable of route switching layer 2 (MAC) MAC SDUs between MAC on remote UE's Uu interface and the MAC on the Uu interface of the relay UE Example 22 may include the eNB of example 20 or some other example herein, wherein the eNB is capable of mapping using the DRB ID and the LCID of Uu between eNB and remote UE, LCID of PC5 between remote UE and relay UE and LCID of Uu between relay UE and eNB and establishing this association using an RRC message Example 23 may include the eNB of example 20 or some other example herein, wherein the eNB is capable of route switching over RLC PDUs between MAC on remote UE's Uu interface and the MAC on the Uu interface of the relay UE Example 24 may include the eNB of example 20 or some other example herein, wherein the eNB is capable of supporting a new relay protocol layer above RLC to deal with relay UE's new bearer containing data from multiple remote UEs Example 25 may include the eNB of example 20 or some other example herein, wherein the eNB is capable of route switching over PDCP SDUs between MAC on remote UE's Uu interface and the MAC on the Uu interface of the relay UE Example 26 may include the eNB of example 20 or some other example herein, wherein the eNB is capable of receiving and processing a new RRC or similar control message from relay UE for path switching when the remote UE moves from direct path to relay path Example 27 may include the eNB of example 20 or some other example herein, wherein the eNB is capable of transmitting RRC or similar control message in response to the received path switch message from the relay UE while switching from direct path to relay path Example 28 may include the eNB of example 20 or some other example herein, wherein the eNB is capable of transmitting RRC or similar control message to control the path switch from the direct path ⌷ relay UE path based on available relay UEs (based on the measurement reporting and use case).

Example 29 may include the eNB of example 28 or some other example herein, wherein the eNB is capable of providing the traffic direction that the specific control message is applicable to (whether in one direction or both).

Example 30 may include the eNB of example 20 or some other example herein, wherein the eNB is capable of receiving data from remote UE through a new relay path as an indication to perform path switching for the remote UE.

Example 31 may include the eNB of example 20 or some other example herein, wherein the eNB is capable of sending relay reconfiguration control message to the relay UE to configure the relay UE for a given remote UE with its remote UE ID (CGI+some form of RNTI) and short ID.

Example 32 may include the eNB of example 20 or some other example herein, wherein the eNB is capable of supporting relay reconfiguration after choosing multiple relay UEs within the candidate relay UE set.

Example 33 may include the eNB of example 20 or some other example herein, wherein the eNB is capable of configuring the remote UE using RRC connection reconfiguration or similar control message with multiple relay UEs configurations.

Example 34 may include the eNB of example 20 or some other example herein, wherein the eNB is capable of allocating a larger temporary identity namely L-RNTI that uniquely identifies the UE within an area larger than the cell.

Example 35 may include the eNB of example 20 or some other example herein, wherein the eNB is capable of transmitting PDCP SDUs based on reporting by the remote UE after selection of new relay UE while moving from old relay UE.

Example 36 may include an apparatus comprising means to perform one or more elements of a method described in or related to any of examples 1-35 and/or any other method or process described herein.

Example 37 may include one or more non-transitory computer-readable media comprising instructions to cause an electronic device, upon execution of the instructions by one or more processors of the electronic device, to perform one or more elements of a method described in or related to any of examples 1-35 and/or any other method or process described herein.

Example 38 may include an apparatus comprising control logic, transmit logic, and/or receive logic to perform one or more elements of a method described in or related to any of examples 1-35 and/or any other method or process described herein.

Example 39 may include a method of communicating in a wireless network as shown and described herein.

Example 40 may include a system for providing wireless communication as shown and described herein.

Example 41 may include a device for providing wireless communication as shown and described herein.

Example 42 may include a remote user equipment (UE) for use in a wireless communication network, the UE comprising a device to network (D2N) entity, a device to device (D2D) entity, and control logic to: receive a service data unit derived from an Internet Protocol (IP) packet, direct the service data unit to the D2N entity for communication with an eNB using a Uu interface in a first mode of operation, and direct the service data unit to the D2D entity for communication with the eNB via a first relay UE using a sidelink interface in a second, relay, mode of operation.

Example 43 may include the remote UE of example 42, wherein the service data unit comprises a MAC service data unit and where in directing the service data unit to the D2N entity comprises directing the service data unit to a D2N MAC entity and directing the service data unit to the D2D entity comprises directing the service data unit to a D2D MAC entity.

Example 44 may include the remote UE of example 43 the control logic further to include a UE identifier in the MAC service data unit Example 45 may include the remote UE of example 42 wherein the service data unit comprises a RLC service data unit and wherein directing the service data unit to the D2N entity comprises directing the service data unit to a first radio link control entity associated with the D2N entity and directing the service data unit to the D2D entity comprises directing the service data unit to a second radio link control entity associated with the D2D entity.

Example 46 may include the remote UE of example 42, wherein the service data unit comprises a PDCP service data unit and wherein directing the service data unit to the D2N entity comprises directing the service data unit to a first packet data convergence protocol entity associated with the D2N entity and directing the service data unit to the D2D entity comprises directing the service data unit to a second packet data convergence protocol entity associated with the D2D entity.

Example 47 may include the remote UE of any of examples 42 to 46, wherein a packet data unit comprising the service data unit further comprises a relay protocol header, the relay protocol header including a UE identifier.

Example 48 may include the remote UE of example 47, wherein the UE identifier comprises one of an RNTI; or a cell global identity combined with a C-RNTI.

Example 49 may include the remote UE of example 47, wherein a plurality of remote UEs are to communicate with the first relay UE, and wherein the UE identifier is to comprise a short ID that uniquely identifies the remote UE within the plurality of remote UEs communicating with the first relay UE.

Example 50 may include the remote UE of any of examples 42 to 49 the control logic further to: determine that the UE is within proximity of a second relay UE, in response to determining that the UE is within proximity of the further relay UE, establishing a connection with the second relay UE by transmitting a Direct Communication Request message.

Example 51 may include the remote UE of example 50, the control logic further to: transmit an indication to the first relay UE to indicate a relay path has been switched to the second relay UE.

Example 52 may include the remote UE of example 50 or example 51, the control logic further to: receive a direct communication response message from the second relay UE, and retransmit to the second relay UE one or more uplink PDCP service data units transmitted to the first relay UE for which the UE has not received an acknowledgement.

Example 53 may include the remote UE of any of examples 50 to 52, wherein the Direct Communication Request message comprises an indication that the request relates to uplink traffic, downlink traffic, or both uplink and downlink traffic.

Example 54 may include a relay user equipment (UE) for use in a wireless communication network, the relay UE comprising: a device to network (D2N) entity, a device to device (D2D) entity, and control logic to: receive a service data unit transmitted by an eNB via the D2N entity, and submit the received service data unit to the D2D entity for transmission to a remote user equipment via a sidelink interface.

Example 55 may include the relay UE of example 54, wherein the sidelink interface comprises a PC5 interface.

Example 56 may include the relay UE of example 54 of example 55, the control logic further to: receive a header associated with the received service data unit, the header comprising a logical channel identifier, map the received service data unit to the D2D entity based on the logical channel identifier.

Example 57 may include the relay UE of any of examples 54 to 56, wherein the relay UE is to relay communications from a plurality of remote UEs, the control logic further to: multiplex a plurality of signaling radio bearers, each signaling radio bearer associated with one of the plurality of remote UEs, and/or a plurality of data radio bearers, each data radio bearer associated with one of the plurality of remote UEs, to a radio bearer for transmission to the eNB.

Example 58 may include the relay UE of example 57, the control logic further to: provide a relay protocol header for service data units received from a remote UE of the plurality of UEs, the relay protocol header comprising a remote UE identifier and a radio bearer identifier associated with the radio bearer on which the service data units are received.

Example 59 may include the relay UE of any of examples 54 to 58, the control logic further to: receive a direct communication request message from a remote UE, and in response to receiving the direct communication request message from the remote UE, transmit a relay path switch message comprising a remote UE identifier to the eNB.

Example 60 may include the relay UE of any of examples 54 to 59, the control logic further to: receive a relay reconfiguration message comprising a remote UE identifier from the eNB, and establish a connection with a remote UE based on the remote UE identifier.

Example 61 may include the relay UE of any of examples 54 to 56, the control logic further to: multiplex a plurality of data radio bearers between the relay UE and a plurality of remote UEs to a plurality of data radio bearers between the relay UE and the eNB based on one of: a quality of service (QoS) parameter associated with each of the plurality of data radio bearers; or on a data radio bearer identity associated with the plurality of data radio bearers.

Example 62 may include the relay UE of any of examples 54 to 61, the control logic further to: determine a communication link with a remote UE has been lost in response to no message being received from the remote UE for a predetermined period of time.

Example 63 may include a eNB for use in a wireless communication network, the eNB comprising: a first device to network (D2N) entity for communicating with a relay user equipment (UE), a second D2N entity for communicating with a remote user equipment, and control logic to: receive a service data unit derived from an IP packet to be communicated to the remote user equipment, direct the service data unit to the first D2N entity for transmission to the relay UE in a first, relay, mode of operation, and direct the service data unit to the second D2N entity for direct transmission to the remote UE in a second mode of operation.

Example 64 may include the eNB of example 63, the control logic further to provide a configuration message for configuring the relay UE to relay a service data unit to the remote UE.

Example 65 may include the eNB of example 63 or example 64, wherein the service data unit comprises a MAC service data unit wherein directing the service data unit to the first D2N entity comprises directing the service data unit to a first D2N MAC entity and directing the service data unit to the second D2N entity comprises directing the service data unit to a second D2N MAC entity.

Example 66 may include the eNB of example 63 or example 64, wherein the service data unit comprises a RLC service data unit and wherein directing the service data unit to the first D2N entity comprises directing the service data unit to a first radio link control (RLC) entity associated with the first D2N entity and directing the service data unit to the second D2N entity comprises directing the service data unit to a second radio link control (RLC) entity associated with the second D2N entity.

Example 67 may include the eNB of example 63 or example 64, wherein the service data unit comprises a PDCP service data unit and wherein directing the service data unit to the first D2N entity comprises directing the service data unit to a first packet data convergence protocol entity associated with the first D2N entity and directing the service data unit to the second D2N entity comprises directing the service data unit to a second packet data convergence protocol entity associated with the second D2N entity.

Example 68 may include the eNB of any of examples 63 to 67, wherein a packet data unit comprising the service data unit further comprises a relay protocol header, the relay protocol header including a UE identifier.

Example 69 may include the eNB of any of examples 63 to 68, the control logic further to: receive a relay path switch message comprising a UE identifier, reconfiguring a relay path for the remote UE associated with the UE identifier, and transmitting a relay path switch response message comprising the UE identifier.

Example 70 may include the eNB of any of examples 63 to 68, the control logic further to: obtain a measurement reporting message from the remote UE, the measurement reporting message including an indication of at least one relay UE in proximity to the remote UE, select a communication path for the remote UE to be relayed via the relay UE based on the measurement reporting message, and transmit a relay reconfiguration message based on the selected communication path.

Example 71 may include the eNB of example 70, wherein the relay reconfiguration message comprises an indication that the selected communication path is to be used for uplink, downlink or uplink and downlink communication between the remote UE and the eNB.

Example 72 may include the eNB of example 70 or example 71, wherein the relay reconfiguration message includes a UE identifier associated with the remote UE to configure the relay UE to communicate with the remote UE.

Example 73 may include the eNB of example 72, wherein the UE identifier comprises one of: an radio network temporary identifier (RNTI); a cell global identity combined with a C-RNTI; and a short ID that uniquely identifies the remote UE from a plurality of remote UEs connected to the relay UE.

Example 74 may include the eNB of any of examples 63 to 73, the control logic further to: receive data from the remote UE via a new relay UE, wherein receiving data via the new relay UE comprises an indication of a path switch by the remote UE.

Example 75 may include the eNB of any of examples 63 to 74, the control logic further to: obtain a measurement reporting message from the remote UE, the measurement reporting message including an indication of at least two relay UE in proximity to the remote UE, select a plurality of communication paths each communication path associated with a different relay UE of a plurality of relay UEs, the plurality of relay UEs forming a candidate relay set.

Example 76 may include the eNB of example 75, the control logic further to: transmit a relay reconfiguration message to the plurality of relay UEs of the candidate relay set, the relay reconfiguration message comprising an identifier associated with the remote UE.

Example 77 may include the eNB of any of examples 63 to 76, the control logic further to: allocate a larger-radio network temporary identifier (L-RNTI) to the remote UE, wherein the L-RNTI uniquely identifies the UE within a plurality of cell areas.

Example 78 may include the eNB of any of examples 63 to 70, the control logic further to: in response to a change in a communication route between the eNB and the remote UE, receive a packet data convergence protocol (PDCP) serial data unit (SDU) sequence number report from the remote UE, and retransmit PDCP SDUs based on the PDCP SDU sequence number report.

Example 79 may include a computer readable medium comprising computer program instructions to, when executed by processing circuitry, cause the processing circuitry to: receive a service data unit derived from an IP packet, direct the service data unit to a D2N entity for communication with an eNB using a Uu interface in a first mode of operation, and direct the service data unit to a D2D entity for communication with the eNB via a first relay UE using a sidelink interface in a second, relay, mode of operation.

Example 80 may include a computer readable medium comprising computer program instructions to, when executed by processing circuitry, cause the processing circuitry to: receive a service data unit transmitted by an eNB via a D2N entity, and submit the received service data unit to a D2D entity for transmission to a remote user equipment via a sidelink interface.

Example 81 may include a computer readable medium comprising computer program instructions to, when executed by processing circuitry, cause the processing circuitry to: receive a service data unit derived from an IP packet to be communicated to a remote user equipment, direct the service data unit to a first D2N entity for transmission to a relay UE in a first, relay, mode of operation, and direct the service data unit to a second D2N entity for direct transmission to the remote UE in a second mode of operation.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

The invention claimed is:

1. A relay user equipment (UE) for use in a wireless communication network, the relay UE comprising:
   a device to network (D2N) entity;
   a device to device (D2D) entity; and
   control logic to:
      receive a service data unit transmitted by an eNB via the D2N entity; and
      submit the received service data unit to the D2D entity for transmission to a remote UE, of a plurality of remote UEs, via a sidelink interface,
   wherein the relay UE is to relay communications from the plurality of remote UEs, the control logic further to:
      multiplex a plurality of signaling radio bearers, each signaling radio bearer associated with one of the plurality of remote UEs, and/or a plurality of data radio bearers, each data radio bearer associated with one of the plurality of remote UEs, to a radio bearer for transmission to the eNB.

2. The relay UE of claim 1, the control logic further to:
   receive a header associated with the received service data unit, the header comprising a logical channel identifier;
   map the received service data unit to the D2D entity based on the logical channel identifier; and
   provide a relay protocol header for service data units received from the remote UE of the plurality of remote UEs, the relay protocol header comprising a remote UE identifier and a radio bearer identifier associated with the radio bearer on which the service data units are received.

3. The relay UE of claim 1, the control logic further to:
   receive a direct communication request message from the remote UE; and
   in response to receiving the direct communication request message from the remote UE, transmit a relay path switch message comprising a remote UE identifier to the eNB.

4. The relay UE of claim 1, the control logic further to:
   receive a relay reconfiguration message comprising a remote UE identifier from the eNB; and
   establish a connection with the remote UE based on the remote UE identifier.

5. The relay UE of claim 1, the control logic further to:
   multiplex a plurality of data radio bearers between the relay UE and the plurality of remote UEs to a plurality of data radio bearers between the relay UE and the eNB based on: a quality of service (QoS) parameter associated with each of the plurality of data radio bearers; or a data radio bearer identity associated with the plurality of data radio bearers.

6. An apparatus for use in a eNB in a wireless communication network, the eNB comprising:
   a first device to network (D2N) entity for communicating with a relay user equipment (UE);
   a second D2N entity for communicating with a remote user equipment; and
   control logic to:
      receive a service data unit derived from an Internet Protocol (IP) packet unit to be communicated to the remote user equipment;
      direct the service data unit to the first D2N entity for transmission to the relay UE in a first, relay, mode of operation;
      direct the service data unit to the second D2N entity for direct transmission to the remote UE in a second mode of operation;
      obtain a measurement reporting message from the remote UE, the measurement reporting message including an indication of at least one relay UE in proximity to the remote UE; select a communication path for the remote UE to be relayed via the relay UE based on the measurement reporting message; and
      transmit a relay reconfiguration message based on the selected communication path; receive data from the remote UE via a new relay UE,
   wherein receiving data via the new relay UE comprises an indication of a path switch by the remote UE.

7. The apparatus of claim 6, the control logic further to provide a configuration message for configuring the relay UE to relay a service data unit to the remote UE.

8. The apparatus claim 6, wherein the service data unit comprises a medium access control (MAC) service data unit wherein directing the service data unit to the first D2N entity comprises directing the service data unit to a first D2N MAC entity and directing the service data unit to the second D2N entity comprises directing the service data unit to a second D2N MAC entity.

9. The apparatus of claim 6, wherein the service data unit comprises a radio link control (RLC) service data unit and wherein directing the service data unit to the first D2N entity comprises directing the service data unit to a first radio link control (RLC) entity associated with the first D2N entity and directing the service data unit to the second D2N entity comprises directing the service data unit to a second radio link control (RLC) entity associated with the second D2N entity.

10. The apparatus of claim 6, wherein the service data unit comprises a packet data convergence protocol (PDCP) service data unit and wherein directing the service data unit to the first D2N entity comprises directing the service data unit to a first packet data convergence protocol entity associated with the first D2N entity and directing the service data unit to the second D2N entity comprises directing the service data unit to a second packet data convergence protocol entity associated with the second D2N entity.

11. The apparatus of claim 6, wherein a packet data unit comprising the service data unit further comprises a relay protocol header, the relay protocol header including a UE identifier.

12. The apparatus of claim 6, the control logic further to:
   receive a relay path switch message comprising a UE identifier;
   reconfiguring a relay path for the remote UE associated with the UE identifier; and
   transmitting a relay path switch response message comprising the UE identifier.

13. The apparatus of claim 6, wherein the relay reconfiguration message comprises an indication that the selected communication path is to be used for uplink, downlink or uplink and downlink communication between the remote UE and the eNB.

14. The apparatus of claim 6, wherein the relay reconfiguration message includes a UE identifier associated with the remote UE to configure the relay UE to communicate with the remote UE; and
   wherein the UE identifier comprises one of: an radio network temporary identifier (RNTI); a cell global identity combined with a C-RNTI; and a short ID that uniquely identifies the remote UE from a plurality of remote UEs connected to the relay UE.

15. The apparatus of claim 6, the control logic further to:
obtain a measurement reporting message from the remote UE, the measurement reporting message including an indication of at least two relay UEs in proximity to the remote UE;
select a plurality of communication paths, each communication path associated with a different relay UE of a plurality of relay UEs, the plurality of relay UEs forming a candidate relay set.

16. One or more non-transitory, computer-readable media having instructions that, when executed by one or more processors of a relay user equipment (UE) that includes a device to network (D2N) entity and a device to device (D2D) entity, cause the UE to:
receive a service data unit transmitted by an eNB via the D2N entity; and
submit the received service data unit to the D2D entity for transmission to a remote UE, of a plurality of remote UEs, via a sidelink interface,
wherein the relay UE is to relay communications from the plurality of remote UEs and the instructions, when executed, further cause the UE to:
multiplex a plurality of signaling radio bearers, each signaling radio bearer associated with one of the plurality of remote UEs, and/or a plurality of data radio bearers, each data radio bearer associated with one of the plurality of remote UEs, to a radio bearer for transmission to the eNB.

17. The non-transitory, computer-readable media of claim 16, wherein the instructions, when executed, further cause the UE to:
receive a header associated with the received service data unit, the header comprising a logical channel identifier;
map the received service data unit to the D2D entity based on the logical channel identifier; and
provide a relay protocol header for service data units received from the remote UE of the plurality of remote UEs, the relay protocol header comprising a remote UE identifier and a radio bearer identifier associated with the radio bearer on which the service data units are received.

18. One or more non-transitory, computer-readable media having instructions that, when executed by one or more processors of an eNB that includes a first device to network (D2N) entity for communicating with a relay user equipment (UE) and a second D2N entity for communicating with a remote user equipment, cause the eNB to:
receive a service data unit derived from an Internet Protocol (IP) packet unit to be communicated to the remote user equipment;
direct the service data unit to the first D2N entity for transmission to the relay UE in a first, relay, mode of operation;
direct the service data unit to the second D2N entity for direct transmission to the remote UE in a second mode of operation;
obtain a measurement reporting message from the remote UE, the measurement reporting message including an indication of at least one relay UE in proximity to the remote UE; select a communication path for the remote UE to be relayed via the relay UE based on the measurement reporting message; and
transmit a relay reconfiguration message based on the selected communication path; receive data from the remote UE via a new relay UE,
wherein receiving data via the new relay UE comprises an indication of a path switch by the remote UE.

19. The one or more non-transitory, computer-readable media of claim 18, wherein the instructions, when executed, further cause the eNB to provide a configuration message for configuring the relay UE to relay a service data unit to the remote UE.

* * * * *